(12) United States Patent
Ross et al.

(10) Patent No.: US 11,568,683 B2
(45) Date of Patent: Jan. 31, 2023

(54) FACIAL BIOMETRICS SYSTEM AND METHOD USING DIGITAL FINGERPRINTS

(71) Applicant: ALITHEON, INC., Bellevue, WA (US)

(72) Inventors: Robert Saxon Ross, Bellevue, WA (US); Evan Murphy Keech, Bellevue, WA (US); David Justin Ross, Bellevue, WA (US); Will Charles Shannon, Bellevue, WA (US); Mark Tocci, Bellevue, WA (US)

(73) Assignee: ALITHEON, INC., Bellevue, WA (US)

( * ) Notice: Subject to any disclaimer, the term of this patent is extended or adjusted under 35 U.S.C. 154(b) by 74 days.

(21) Appl. No.: 17/209,466

(22) Filed: Mar. 23, 2021

(65) Prior Publication Data

US 2021/0295077 A1    Sep. 23, 2021

Related U.S. Application Data

(60) Provisional application No. 63/015,430, filed on Apr. 24, 2020, provisional application No. 62/993,693, filed on Mar. 23, 2020.

(51) Int. Cl.
*H04N 9/47*      (2006.01)
*G06V 40/50*    (2022.01)
(Continued)

(52) U.S. Cl.
CPC ............... *G06V 40/50* (2022.01); *G06T 5/50* (2013.01); *G06V 40/171* (2022.01);
(Continued)

(58) Field of Classification Search
CPC .... H04N 7/181; H04N 5/247; H04N 5/23238; H04N 5/232939; H04N 5/265;
(Continued)

(56) References Cited

U.S. PATENT DOCUMENTS 4,218,674 A    8/1980    Brosow et al.
4,423,415 A    12/1983   Goldman
(Continued)

FOREIGN PATENT DOCUMENTS

DE    102006005927 A1    8/2007
EP        0439669 A2     8/1991
(Continued)

OTHER PUBLICATIONS

Anonymous, "Intrinsic Characteristics for Authentication" & "Alp Vision Advances Security Through Digital Technology," Authentication News vol. 12, (No. 9) pp. 2, 7 and 8, dated Sep. 2006, 3 pages total.

(Continued)

*Primary Examiner* — Masum Billah
(74) *Attorney, Agent, or Firm* — Cozen O'Connor

(57) ABSTRACT

Facial biometric systems and methods employ digital fingerprints that represent facial characteristics. These systems and methods may perform various digital fingerprint related processes including induction (acquiring of the facial data, generation of a digital fingerprint and storing in a database) and authentication (a process of using the digital fingerprint of the face to perform biometrics). The facial biometric system and method combines these processes with a particular set of hardware to perform the facial biometrics process that is novel and provides benefits and capabilities not achievable by other biometric systems and methods.

25 Claims, 7 Drawing Sheets

(51) Int. Cl.
  *G06T 5/50* (2006.01)
  *H04N 5/225* (2006.01)
  *H04N 5/247* (2006.01)
  *G06V 40/16* (2022.01)

(52) U.S. Cl.
  CPC ......... *G06V 40/172* (2022.01); *H04N 5/2256* (2013.01); *H04N 5/247* (2013.01); *G06T 2207/20221* (2013.01); *G06T 2207/30201* (2013.01)

(58) Field of Classification Search
  CPC ............. H04N 5/44504; H04N 13/239; H04N 13/246; H04N 2007/145; G06V 20/46; G06V 30/418; G06V 10/25; G06V 10/255; G06V 10/40; G06V 10/44; G06V 10/50; G06V 20/64; G06V 20/647
  USPC .......................................................... 348/77
  See application file for complete search history.

(56) References Cited

U.S. PATENT DOCUMENTS

| | | |
|---|---|---|
| 4,677,435 A | 6/1987 | Causse et al. |
| 4,700,400 A | 10/1987 | Ross |
| 4,883,971 A | 11/1989 | Jensen |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta et al. |
| 5,422,821 A | 6/1995 | Allen et al. |
| 5,514,863 A | 5/1996 | Williams |
| 5,518,122 A | 5/1996 | Tilles et al. |
| 5,521,984 A | 5/1996 | Denenberg et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,961,466 B2 | 11/2005 | Imagawa et al. |
| 6,985,925 B2 | 1/2006 | Ogawa |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce et al. |
| 7,477,780 B2 | 1/2009 | Boncyk et al. |
| 7,518,080 B2 | 4/2009 | Amato |
| 7,602,938 B2 | 10/2009 | Prokoski |
| 7,674,995 B2 | 3/2010 | Desprez et al. |
| 7,676,433 B1 | 3/2010 | Ross et al. |
| 7,680,306 B2 | 3/2010 | Boutant et al. |
| 7,720,256 B2 | 5/2010 | Desprez et al. |
| 7,726,457 B2 | 6/2010 | Maier et al. |
| 7,726,548 B2 | 6/2010 | Delavergne |
| 7,748,029 B2 | 6/2010 | Ross |
| 7,822,263 B2 | 10/2010 | Prokoski |
| 7,834,289 B2 | 11/2010 | Orbke et al. |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,180,174 B2 | 5/2012 | Di et al. |
| 8,180,667 B1 | 5/2012 | Baluja et al. |
| 8,194,938 B2 | 6/2012 | Wechsler et al. |
| 8,316,418 B2 | 11/2012 | Ross |
| 8,374,020 B2 | 2/2013 | Katti |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette et al. |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig et al. |
| 8,526,743 B1 | 9/2013 | Campbell et al. |
| 8,774,455 B2 | 7/2014 | Elmenhurst et al. |
| 8,959,029 B2 | 2/2015 | Jones et al. |
| 9,031,329 B1 | 5/2015 | Farid et al. |
| 9,058,543 B2 | 6/2015 | Campbell et al. |
| 9,152,862 B2 | 10/2015 | Ross et al. |
| 9,170,654 B1 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,507 B1 | 6/2016 | Hoyos et al. |
| 9,361,596 B2 | 6/2016 | Ross et al. |
| 9,424,461 B1 | 8/2016 | Yuan et al. |
| 9,443,298 B2 | 9/2016 | Ross et al. |
| 9,558,463 B2 | 1/2017 | Ross et al. |
| 9,582,714 B2 | 2/2017 | Ross et al. |
| 9,646,206 B2 | 5/2017 | Ross et al. |
| 9,665,800 B1 | 5/2017 | Kuffner |
| 9,741,724 B2 | 8/2017 | Seshadri et al. |
| 10,037,537 B2 | 7/2018 | Withrow et al. |
| 10,043,073 B2 | 8/2018 | Ross et al. |
| 10,192,140 B2 | 1/2019 | Ross et al. |
| 10,199,886 B2 | 2/2019 | Li et al. |
| 10,346,852 B2 | 7/2019 | Ross et al. |
| 10,505,726 B1 | 12/2019 | Andon et al. |
| 10,540,664 B2 | 1/2020 | Ross et al. |
| 10,572,883 B2 | 2/2020 | Ross et al. |
| 10,621,594 B2 | 4/2020 | Land et al. |
| 10,824,055 B1* | 11/2020 | McGuire ............... H04N 5/2354 |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0134836 A1 | 9/2002 | Cash et al. |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0138128 A1 | 7/2003 | Rhoads |
| 2003/0179931 A1 | 9/2003 | Sun |
| 2003/0182018 A1 | 9/2003 | Snapp |
| 2003/0208298 A1 | 11/2003 | Edmonds |

(56) References Cited

U.S. PATENT DOCUMENTS

| | | |
|---|---|---|
| 2003/0219145 A1 | 11/2003 | Smith |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1 | 11/2004 | Houle et al. |
| 2004/0250085 A1 | 12/2004 | Tattan et al. |
| 2005/0007776 A1 | 1/2005 | Monk et al. |
| 2005/0038756 A1 | 2/2005 | Nagel |
| 2005/0065719 A1 | 3/2005 | Khan et al. |
| 2005/0086256 A1 | 4/2005 | Owens et al. |
| 2005/0111618 A1 | 5/2005 | Sommer et al. |
| 2005/0119786 A1 | 6/2005 | Kadaba |
| 2005/0125360 A1 | 6/2005 | Tidwell et al. |
| 2005/0131576 A1 | 6/2005 | De et al. |
| 2005/0137882 A1 | 6/2005 | Cameron et al. |
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0056041 A1 | 3/2007 | Goodman |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0230656 A1 | 10/2007 | Lowes et al. |
| 2007/0263267 A1 | 11/2007 | Ditt |
| 2007/0269043 A1 | 11/2007 | Launay et al. |
| 2007/0282900 A1 | 12/2007 | Owens et al. |
| 2008/0008377 A1 | 1/2008 | Andel et al. |
| 2008/0011841 A1 | 1/2008 | Self et al. |
| 2008/0013804 A1 | 1/2008 | Moon et al. |
| 2008/0128496 A1 | 6/2008 | Bertranou et al. |
| 2008/0130947 A1 | 6/2008 | Ross et al. |
| 2008/0219503 A1 | 9/2008 | Di et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos |
| 2009/0271029 A1 | 10/2009 | Doutre |
| 2009/0287498 A2 | 11/2009 | Choi |
| 2009/0307005 A1 | 12/2009 | Omartin et al. |
| 2010/0027834 A1 | 2/2010 | Spitzig et al. |
| 2010/0054551 A1 | 3/2010 | Decoux |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2010/0286815 A1 | 11/2010 | Zimmermann |
| 2011/0026831 A1 | 2/2011 | Perronnin et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0042171 A1 | 2/2012 | White et al. |
| 2012/0089639 A1 | 4/2012 | Wang |
| 2012/0130868 A1 | 5/2012 | Loeken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Di Venuto Dayer et al. |
| 2012/0250945 A1 | 10/2012 | Peng et al. |
| 2013/0162394 A1 | 6/2013 | Etchegoyen |
| 2013/0212027 A1 | 8/2013 | Sharma et al. |
| 2013/0214164 A1 | 8/2013 | Zhang et al. |
| 2013/0273968 A1 | 10/2013 | Rhoads et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0140571 A1 | 5/2014 | Elmenhurst et al. |
| 2014/0184843 A1 | 7/2014 | Campbell et al. |
| 2014/0201094 A1 | 7/2014 | Herrington et al. |
| 2014/0270341 A1 | 9/2014 | Elmenhurst et al. |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0067346 A1 | 3/2015 | Ross et al. |
| 2015/0078629 A1 | 3/2015 | Gottemukkula et al. |
| 2015/0086068 A1 | 3/2015 | Mulhearn et al. |
| 2015/0117701 A1 | 4/2015 | Ross et al. |
| 2015/0127430 A1 | 5/2015 | Hammer |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2015/0371087 A1 | 12/2015 | Ross et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0117631 A1 | 4/2016 | McCloskey et al. |
| 2016/0162734 A1 | 6/2016 | Ross et al. |
| 2016/0180546 A1 | 6/2016 | Kim et al. |
| 2016/0189510 A1 | 6/2016 | Hutz |
| 2016/0203387 A1 | 7/2016 | Lee et al. |
| 2016/0300234 A1 | 10/2016 | Moss-Pultz et al. |
| 2016/0335520 A1 | 11/2016 | Ross et al. |
| 2017/0004444 A1 | 1/2017 | Krasko et al. |
| 2017/0032285 A1 | 2/2017 | Sharma et al. |
| 2017/0076132 A1 | 3/2017 | Sezan et al. |
| 2017/0132458 A1 | 5/2017 | Short et al. |
| 2017/0153069 A1 | 6/2017 | Huang et al. |
| 2017/0243230 A1 | 8/2017 | Ross et al. |
| 2017/0243231 A1 | 8/2017 | Withrow et al. |
| 2017/0243232 A1 | 8/2017 | Ross et al. |
| 2017/0243233 A1 | 8/2017 | Land et al. |
| 2017/0249491 A1 | 8/2017 | MacIntosh et al. |
| 2017/0251143 A1 | 8/2017 | Peruch et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0344824 A1 | 11/2017 | Martin |
| 2017/0372327 A1 | 12/2017 | Withrow |
| 2018/0000359 A1 | 1/2018 | Watanabe |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0053312 A1 | 2/2018 | Ross et al. |
| 2018/0121643 A1 | 5/2018 | Talwerdi et al. |
| 2018/0144211 A1 | 5/2018 | Ross et al. |
| 2018/0315058 A1 | 11/2018 | Withrow et al. |
| 2018/0349694 A1 | 12/2018 | Ross et al. |
| 2019/0026581 A1 | 1/2019 | Leizerson |
| 2019/0034518 A1 | 1/2019 | Liu et al. |

(56) References Cited

U.S. PATENT DOCUMENTS

| | | |
|---|---|---|
| 2019/0034694 A1 | 1/2019 | Ross |
| 2019/0102873 A1 | 4/2019 | Wang et al. |
| 2019/0102973 A1 | 4/2019 | Oyama et al. |
| 2019/0130082 A1 | 5/2019 | Alameh et al. |
| 2019/0228174 A1 | 7/2019 | Withrow et al. |
| 2019/0266373 A1 | 8/2019 | Hirokawa |
| 2019/0287118 A1 | 9/2019 | Ross et al. |
| 2019/0342102 A1 | 11/2019 | Hao et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Shannon et al. |
| 2020/0334689 A1 | 10/2020 | Withrow |
| 2020/0349379 A1 | 11/2020 | Ross |
| 2020/0356772 A1 | 11/2020 | Withrow et al. |

FOREIGN PATENT DOCUMENTS

| | | |
|---|---|---|
| EP | 0759596 A2 | 2/1997 |
| EP | 1016548 A2 | 7/2000 |
| EP | 1016549 A1 | 7/2000 |
| EP | 1719070 B1 | 4/2009 |
| EP | 2107506 A1 | 10/2009 |
| EP | 2166493 A1 | 3/2010 |
| EP | 2195621 B1 | 11/2013 |
| EP | 2866193 A1 | 4/2015 |
| EP | 2257909 B1 | 5/2015 |
| EP | 2869240 A2 | 5/2015 |
| EP | 2869241 A2 | 5/2015 |
| EP | 3208744 A1 | 8/2017 |
| EP | 3249581 A1 | 11/2017 |
| EP | 3270342 A1 | 1/2018 |
| EP | 3435287 A2 | 1/2019 |
| EP | 3514715 A1 | 7/2019 |
| GB | 2097979 A | 11/1982 |
| GB | 2482127 A | 1/2012 |
| JP | 61234481 A | 10/1986 |
| JP | H07192112 | 7/1995 |
| JP | 2007213148 A | 8/2007 |
| KR | 20120009654 A | 2/2012 |
| WO | 2005086616 A2 | 9/2005 |
| WO | 2006038114 A1 | 4/2006 |
| WO | 2007028799 A1 | 3/2007 |
| WO | 2007031176 A1 | 3/2007 |
| WO | 2007071788 A1 | 6/2007 |
| WO | 2007090437 A1 | 8/2007 |
| WO | 2007144598 A1 | 12/2007 |
| WO | 2009030853 A1 | 3/2009 |
| WO | 2009089126 A1 | 7/2009 |
| WO | 2009115611 A2 | 9/2009 |
| WO | 2010018464 A2 | 2/2010 |
| WO | 2010018646 A1 | 2/2010 |
| WO | 2012145842 A1 | 11/2012 |
| WO | 2013051019 A1 | 4/2013 |
| WO | 2013126221 A1 | 8/2013 |
| WO | 2013173408 A1 | 11/2013 |
| WO | 2015004434 A1 | 1/2015 |
| WO | 2016081831 A1 | 5/2016 |

OTHER PUBLICATIONS

Bao et al., "Local Feature based Multiple Object Instance Identification using Scale and Rotation Invariant Implicit Shape Model," 12th Asian Conference on Computer Vision, Singapore, Singapore, Nov. 1-5, 2014, pp. 600-614.

Beekhof et al., "Secure Surface Identification Codes," Proceeding of the SPIE 6819: Security Forensics, Steganography, and Watermarking of Multimedia Contents X:68190D, 2008. (12 pages).

Buchanan et al., "Fingerprinting documents and packaging," Nature 436 (7050): 475, 2005.

Cavoukian et al. "Biometric Encryption: Technology for Strong Authentication, Security and Privacy," 2008, WE, Intl. Fed. Iot Info Processing, vol. 261; Policies and Research in Identity Management; pp. 57-77.

Di Paola et al., "An Autonomous Mobile Robotic System for Surveillance of Indoor Environments," International Journal of Advanced Robotic Systems 7(1): 19-26, 2010.

Drew, M. S., et al., "Sharpening from Shadows: Sensor Transforms for Removing Shadows using a Single Image," Color and Imaging Conference, vol. 5, Society for Imaging Science and Technology, 2009, pp. 267-271.

Ebay, "eBay Launches Must-Have !Phone App Red Laser 3.0" published Nov. 18, 2011; https://www.ebayinc.com/stories/news/ebay-launches-must-have-iphone-app-redlaser-30/, downloaded Mar. 21, 2019, 7 pages).

Entropy.com Website History, Wayback Machine; https://web.archive.org/web/20 I 60330060808/https://www.entrupy.com/; Mar. 30, 2016 (Year: 2016), 2 pages.

Extended European Search Report Application No. 21153877.2, dated Jun. 15, 2021, 8 pages.

Extended European Search Report, dated Jun. 18, 2021, for European Application No. 21153355.9, 8 pages.

Farid, "Digital Image Forensics", Dartmouth CS 89/189, Sprint 2013; 199 pages.

Fischler et al., "Random Sample Consensus: A Paradigm for Model Fitting with Applications to Image Analysis and Automated Cartography," Communication of the ACM 24(6); 381-395, 1981.

Huang et al., "A Novel Binarization Algorithm for Ballistic Imaging Systems," 3rd International Congress on Image and Signal Processing, Yantai, China, Oct. 16-18, 2010, pp. 1287-1291.

Huang, et al., "An Online Ballistics Imaging System for Firearm Identification"; 2nd International Conference on Signal Processing Systems, Dalian, China, Jul. 5-7, 2010, vol. 2, pp. 68-72.

Kartik et al., "Security System with Face Recognition, SMS Alert and Embedded Network Video Monitoring Terminal," International Journal of Security, Privacy and Trust Management 2(5):9-19, 2013.

Li, "Image Processing for the Positive Identification of Forensic Ballistics Specimens," Proceedings of the 6th International Conference of Information Fusion, Cairns, Australia, Jul. 8-11, 2003, pp. 1494-1498.

Li, "Firearm Identification System Based on Ballistics Image Processing," Congress on Image and Signal Processing, School of Computer and Information Science, Faculty of Computing, Health and Science Edith Cowan University, Perth, Australia pp. 149-154.

Maddern et al., "Illumination Invariant Imaging: Applications in Robust Vision-based Localization, Mapping and Classification for Autonomous Vehicles," IEEE International Conference on Robotics and Automation, Hong Kong, May 31-Jun. 7, 2014, 8 pages.

Matsumoto et al., "Nano-artifact metrics based on random collapse of resist," Scientific Reports 4:6142, 2014 (5 pages).

Mistry et al., "Comparison of Feature Detection and Matching Approaches: SIFT and SURF," Global Research and Development Journal for Engineering, vol. 2, Issue 4, Mar. 2017, 8 pages.

Online NCOALink® Processing Acknowledgement Form (PAF) Released by Lorton Data, Jun. 2, 2009, URL=http://us.generation-nt.com/online-ncoalink-processingacknowledgement-form-paf-released-by-press-1567191.html, download date Jun. 25, 2010, 2 pages.

Rublee et al., "ORB: an efficient alternative to SIFT or Surf," IEEE International Conference on Computer Vision, Barcelona, Spain, Nov. 6-13, 2011, 8 pages.

Schneider et al., "A Robust Content Based Digital Signature for Image Authentication," Proceeding of the International Conference on Image Processing Lausanne, Switzerland, Sep. 19, 1996, pp. 227-230.

Schwabe Williamson & Wyatt, PC—Listing of Related Cases; dated Sep. 16, 2017; 2 pages.

Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.

Shi et al., "Smart Cameras: Fundamentals and Classification," Chapter 2, Belbachir (ed.), Smart Cameras, Springer, New York, New York, USA 2010, pp. 19-34.

(56) References Cited

OTHER PUBLICATIONS

Shields, "How to Shop Savvy With Red Laser," published online on Mar. 22, 2010; https ://i phone .appstomn .net/reviews/lifesty le/how-to-shop-savvy-with-redlaser /, downloaded Mar. 22, 2010, 8 pages).

Smith, "Fireball: A Forensic Ballistic Imaging System: Proceedings of the 31st Annual International Carnahan Conference on Security Technology," Canberra, Australia, Oct. 15-17, 1997, pp. 64-70.

Takahashi et al., "Mass-produced Parts Traceability System Based on Automated Scanning of Fingerprint of Things," 15th IAPR International Conference on Machine Vision Applications, Nagoya, Japan, May 8-12, 2017, 5 pages.

United States Postal Service, "NCOALink Systems", http:/ /www.usps.com/ncsc/addressservices/moveupdate/changeaddress.htm, website accessed Jun. 23, 2010, 2 pages.

United States Postal Service, "Postal Addressing Standards," Publication Jul. 28, 2008, 55 pages.

United States Postal Services, NCOALink® Systems, dated May 27, 2009, URL=http://ribbs.usps.gov/ncoalink/ncoalink_print.htm, download date Jun. 23, 2010, 3 pages.

Veena et al., "Automatic Theft Security System (Smart Surveillance Camera)," Computer Science & Information Technology 3:75-87, 2013.

Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.

Farid, Ahmed , et al., "Integrated fingerprint verification method using a composite signature-based watermarking technique", Optical Engineering, The Catholic University of America, (Year: 2007), 6 pages.

Jain, Anil K, et al., "Biometric Cryptosystems: Issues and Challenges", Proceedings of the IEEE, IEEE, New York, US, vol. 92, No. 6, Jun. 1, 2004, XP011112757, pp. 948-960.

Truong, Hieu C, et al., "Royal Canadian Mint/Signoptic Technologies Coin DNA Technology", World Money Fair (WMF) Berlin Feb. 1-3, 2011, http://www.amisdeleuro.org/upload/1340734488. pptx, 22 pages.

Zaeri, Naser , "Minutiae-based Fingerprint Extraction and Recognition, 2020 (year 2010)", 47 pages.

\* cited by examiner

FACIAL BIOMETRICS SYSTEM AND METHOD USING DIGITAL FINGERPRINTS

RELATED APPLICATIONS

This application is related to U.S. application Ser. No. 16/045,642, "Model-Based Digital Fingerprinting" filed Jul. 25, 2018, which claims the benefit of U.S. Provisional Application No. 62/536,496, filed Jul. 25, 2017, and which is incorporated herein by reference. The application is related to U.S. application Ser. No. 16/681,698, "Contact and Non-Contact Image-Based Biometrics Using Physiological Elements" filed Nov. 12, 2019 and which is incorporated herein by reference. The application is related to U.S. Provisional Application No. 63/014,680, "Transform Pyramiding for Fingerprint Matching System and Method" filed Apr. 23, 2020, and which is incorporated herein by reference. The application is related to U.S. Provisional Application No. 63/015,430, "Facial Biometrics System And Method Using Digital Fingerprints" filed Apr. 24, 2020, and which is incorporated herein by reference.

COPYRIGHT NOTICE

COPYRIGHT © 2018-2020 Alitheon, Inc. A portion of the disclosure of this document contains material which is subject to copyright protection. The copyright owner has no objection to the facsimile reproduction by anyone of the document or the disclosure, as it appears in the Patent and Trademark Office file or records, but otherwise reserves all copyright rights whatsoever. 37 C.F.R. § 1.71(d) (2017).

FIELD

The present disclosure relates to a biometrics system that uses the face for biometrics and in particular to a facial biometrics system that uses digital fingerprints.

BACKGROUND

Many forms of biometric information may be used to identify people. Each current biometric approach is uniquely based on features appropriate to the particular area of the body used for identification. Thus, fingerprint identification only works on fingers, face recognition only works on features of the face, iris recognition only works on irises, and so on.

Among the most common forms of human biometrics are fingerprints, palm prints, and face recognition. Each of these techniques has associated technical and privacy concerns. For example, fingerprints and palm prints are limited technically because they require contact with a glass plate prior to collecting the information. The plate in these techniques is subject to getting dirty, thereby reducing the quality of incoming data and operational "up time," and physical human contact with the platen can contribute to the spread of sickness or disease-causing pathogen. Any assurances from those in the contact scanner industry that the "finger zone will be touched far less frequently than a restroom door" are not reassuring.

While face recognition systems do not suffer from the same limitations as fingerprint and palm print systems, it is known that face recognition systems require full-frontal images with reasonably high definition (e.g., 720p, 1080p). Not only do lower quality images and off-axis face angles cause problems, the need for substantial computing resources to store and process face images is also limiting. Furthermore, face recognition as it is commonly performed from facial images is worrisome from civil liberties, profiling, and privacy perspectives.

In addition, some forms of biometric information can be faked. For example, optical fingerprint methods can sometimes be fooled by model fingers inscribed with copied fingerprints. It would also be possible to detach the finger of a person and use the fingerprint on the detached finger in many fingerprint systems.

Thus, it is desirable to provide a facial biometrics system and method that uses digital fingerprints while overcoming the above technical problems, privacy concerns and spoofing that may occur with known systems and it is to this end that the disclosure is directed.

DETAILED DESCRIPTION OF ONE OR MORE EMBODIMENTS

Figure 1:
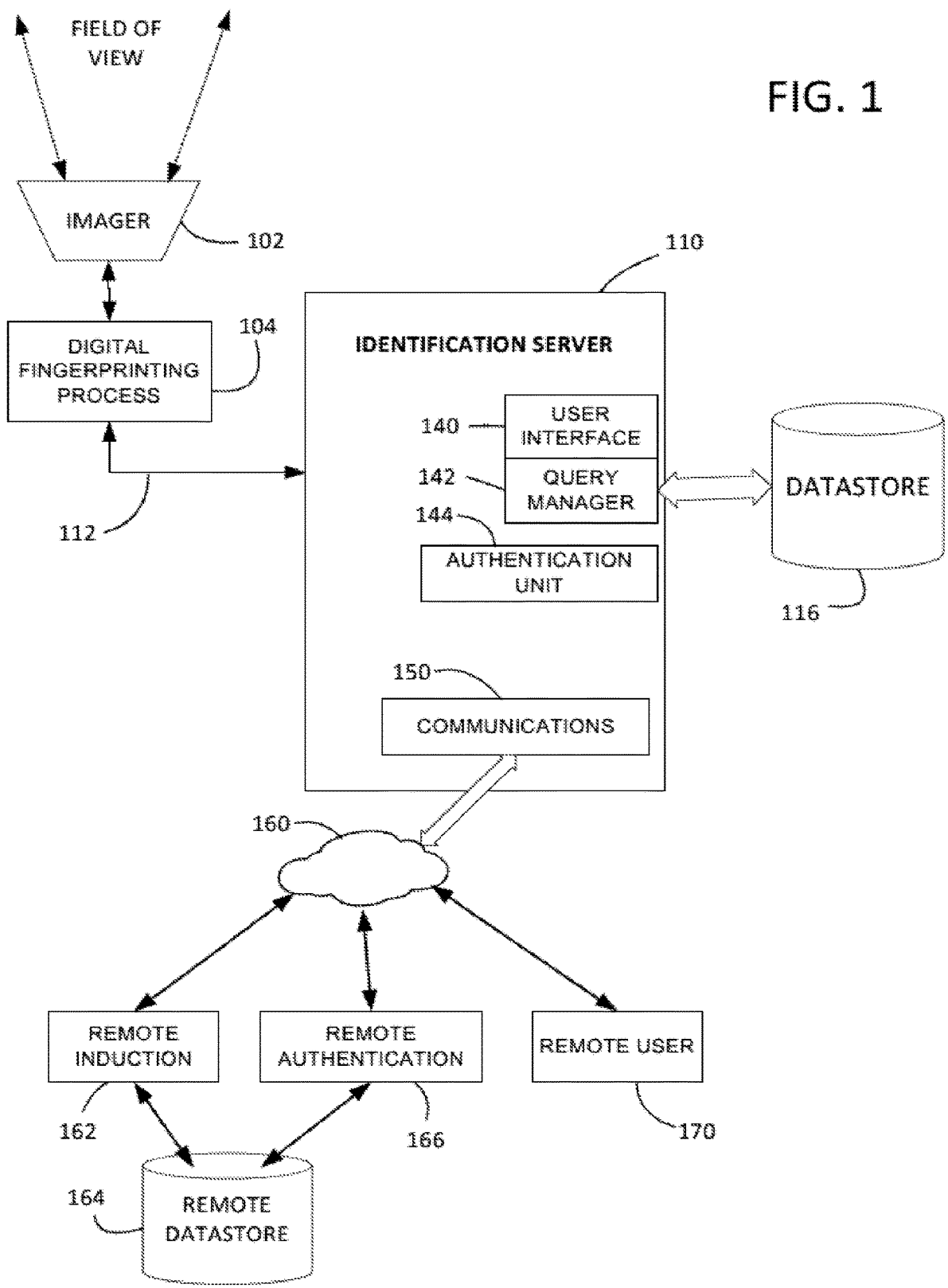
FIG. 1 is a schematic diagram illustrating an object authentication system that uses digital fingerprints, according to at least one illustrated implementation.

The disclosure is particularly applicable to facial biometrics systems and methods that use the digital fingerprints as generated by Alitheon, Inc. and as described in at least U.S. Pat. Nos. 16/045,642 and 16/681,698 and U.S. Provisional Patent No. 63/014,680. It will be appreciated, however, that the facial biometric systems and methods have greater utility since such can be implemented using other known or yet to be developed digital fingerprinting systems. Furthermore, the facial biometrics systems and methods may be used for a security system at an airport or in a secured building or location. In the airport use case, the system and method may be used to identify and/or authenticate without identifying passenger(s) who are on premises at the airport, person(s) at the bag drop, at check-in, at security, entering the airplane and collecting baggage so that the system may be used to track the location of an individual during the time that the individual is at the airport. In addition, it may be possible to use the below described biometric system and method for a three dimensional part or other non-living product or object, such as a handbag, that can change between each acquisition of an image of the inanimate object/product.

The facial biometric systems and methods using the digital fingerprints may perform various digital fingerprint related processes including induction (acquiring of the facial data, generation of a digital fingerprint and storing in a database) and authentication (a process of using the digital fingerprint of the face to perform biometrics. The facial biometric systems and methods combine these processes with a particular set of hardware to perform the facial biometrics process that is novel and provides benefits and capabilities not achievable by other existing biometric systems and methods.

At a high level, the facial biometrics system and method seeks to match a set of features (that form a digital fingerprint) extracted from one or more image(s) of a person's face (or of other strongly 3-dimensional objects) with features stored in a database and linked to various kinds of information. In one embodiment, the objective of the disclosed system is to accurately link a digital fingerprint taken of a person's face with a file or program. That file or program may contain identification information, access and action permissions, or nearly anything else digital. Access permission may, for example, be provided based on authentication without identifying the individual.

The taught system is generally opt-in at induction, meaning that in most of the embodiments the individual is inducted by standing in front of a kiosk which captures multiple images from different cameras. Later, authentication is achieved either with the person standing in front of a similar kiosk or by other means such as those discussed below. The taught system securely links a physical object—in this case a person's face—with a digital object—in this case a file containing permissions to do something (such as enter a secure space or access a bank account), identification information, or other information that is supposed to be linked securely to the individual. We call this secure linkage "authentication". This current disclosure teaches the system for deriving and exploiting that secure link when the input data are representations of portions of faces or other malleable strongly 3D objects.

This disclosure has several parts. This disclosure starts with descriptions of exemplary hardware that may be used capture the input from which features are extracted. The process of generating digital fingerprints from the captured inputs is the described, followed by the process of matching which may be said to authenticate individuals or other objects using the digital fingerprints. The features that facilitate the matching is then described.

Hardware is then described that is specific for authentication using facial biometrics and the process of authentication using the biometrics. Lastly, kiosk to kiosk matching (3D to 3D matching) will be described along with the additions to the system that 2D to 3D matching entails and then what 2D to 2D matching entails.

FIG. 1 shows an object authentication system that uses digital fingerprints, according to at least one illustrated implementation. In the system, an object (not shown) may be placed into the field of view (indicated by the dashed lines) of the scanner or imager 102. The captured image or image data is processed by a process 104 to extract digital fingerprint(s) therefrom. Digital fingerprinting is described in more detail below. These elements may be discrete or integrated. For example, the scanner or imager 102 may be a camera in a smartphone, and the digital fingerprinting process may be an app on the same smartphone. Alternatively, intermediate data (for example, digital image data) may be transmitted over a network to a remote processor to generate one or more digital fingerprints from the image data. For example, a remote induction facility 162 may communicate over a network 160 with an identification server 110, or simply induct the object by storing generated digital fingerprints into a datastore 164 coupled to the induction facility. The induction facility may comprise, for example, a program or a programmed server as well as another imager 102.

The digital fingerprint of the object may be securely communicated to the server 110 via path 112 using known communications technology. The server 110 is coupled to (or includes) a datastore 116. The data store may contain various databases and or tables, including, for example, records that store digital fingerprints. The server may implement, for example, a user interface 140, a query manager 142 for interaction with the datastore 116, and an authentication unit, process, and or application 144. One use of the authentication unit 144 may be to identify and/or authenticate an object (e.g., a human) based on an acquired digital fingerprint or the matching of two digital fingerprints of the object acquired at different time and under different conditions. To identify and/or authenticate an object (e.g., a human), the authentication unit 144 may acquire a digital fingerprint (from a local scanner 102 or remotely 162) and using the query manager 142, search the datastore 116 to find a matching (or best match) digital fingerprint record. In one aspect, it is this matching and/or authentication process that are improved using the transform pyramiding technique that is discussed in more detail in U.S. Provisional Application No. 63/014,680, "Transform Pyramiding for Fingerprint Matching System and Method" filed Apr. 23, 2020. The transform pyramiding technique may be performed by various combinations of the elements of the system in FIG. 1 and may be implemented as a plurality of lines of computer code or processor-executable instructions executed by one or more processors of an element in FIG. 1 or may be implemented in a piece of hardware that performs the operations/processes of the transform pyramiding technique.

In this illustrative example, the server 110 typically may also include a communications component 150. Various communications components 150 may be included to communicate for example, over a network 160 which may be local, wide area, internet, etc. Without limitation, communications components 150 may include any one or more of wired communications ports, wireless transmitters, wireless receivers, wireless transceivers, and/or radios. The data control server may implement record keeping and various other workflows.

All forms of capturing 2D, 3D surface, 3D depth (i.e., "inside"), and features that change during the acquisitions are in view of the present disclosure. One or more transforms, for example, similarity, affine, and homographic transforms of 2D images and or full projective transforms of 3D objects and surfaces may be used to improve the matching techniques described herein.

The capturing thus may include photon-based forms such as X-rays, tomography or image/video capture using a smartphone device camera, and also non-photon approaches such as ultrasound. In the simplified drawing of FIG. 1, the imager 102 may comprise any or all of these imaging technologies. The imager 102 may collect one or more still images and may assemble them into a video of the object. Electromagnetic radiation in different frequency ranges can be used to gather both surface image information and shape information, which may individually or in combination contribute to the characterization of a point of interest. Different methods can be concurrently used for the two types of data. For example, an infrared depth camera can provide shape information, and a visual light camera can provide surface image characteristics. The shape information and surface image characteristics information can be combined into the digital fingerprint. The apparatus of this disclosure may use visible light, infrared (IR), ultraviolet (UV), and any other method of collecting surface image characteristics. Sound recorders may acquire sound characteristics of the object. The present disclosure covers the use of any method of gathering surface image and/or shape information, including stereo, focus stacking, structure from motion, pattern projection, time-of-flight, and Lidar. The present disclosure covers any method of collecting internal data, whether depth-based, projective, or of any other means, including X-Rays, tomography, and high-frequency microwaves. The present disclosure covers any one or combination of these methods of capturing, gathering, and collecting information, and any other like means of acquiring such information, whether effectively instantaneously or over a period of time. It also covers mixed mode acquisitions of data used to digitally fingerprint different characteristics of the object.

Figure 2A:
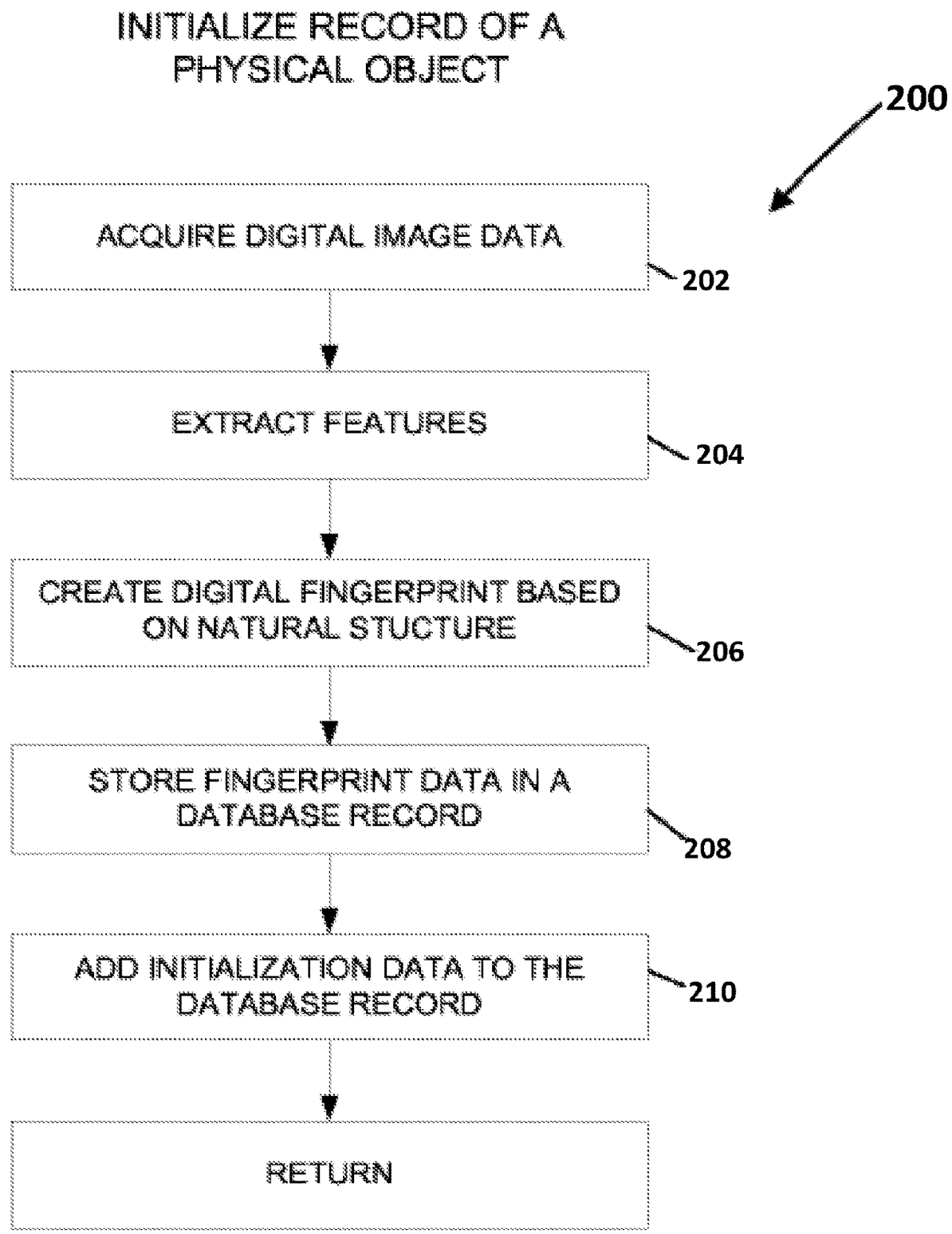
FIGS. 2A and 2B are flowcharts illustrating two methods for generating a digital fingerprint for an object, according to at least one illustrated implementation.

FIG. 2A shows a simplified flow diagram illustrating a method 200 for creating and storing or "registering" a digital fingerprint of an object (e.g., a portion of a human face) in a datastore in form of a database, according to at least one illustrated implementation. The process, in one embodiment, includes acquiring a digital image of the object (e.g., a portion of a human face), block 202, as discussed above. A variety of image capture technologies and devices may be used as noted. Next, features are extracted, block 204, from the digital image data. As explained, specific features or regions of interest (authentication regions) may be selected in support of subsequent identification or authentication of the object (e.g., a human). The extracted features are analyzed and feature vectors are extracted to form a digital fingerprint (i.e., a digital file or record) associated with the original image data, indicated at block 206. The digital fingerprint preferably may be stored in a database record at block 208. Other forms of searchable digital data storage should be deemed equivalents. Further, at block 210, initialization data may be added to the database record, or associated with the database record in a related table. This data is associated with the physical object that was scanned. The associated data may include a wide variety of data including, for example, a description, manufacturer, model number, serial number, content, and any other type of data that may be selected as appropriate or useful for a particular type of object. In some implementations, the initialization data may, for example, include access specifications which specify locations or areas of controlled access and/or days, dates and/or times, during which access is permitted on a controlled basis to an authorized individual. Additionally or alternatively, the initialization data may, for example, include access specifications which specify flights, trains, ships, and/or other vehicles that have controlled access and/or days, dates and/or times, during which access is permitted on a controlled basis to an authorized individual. Such the initialization data may further include access specifications for baggage, luggage or parcels, for example baggage, luggage or parcels that are authorized or carried by or otherwise belong to authorized individuals. In at least some implementations, the digital fingerprint for an individual may be anonymized, having no the initialization data that would identify the individual from which the digital fingerprint was generated. The system would be able to subsequently authenticate that individual (e.g., determine that a sample digital fingerprint from that individual matches within some level of tolerance a reference digital fingerprint from that individual) without having to establish the actual identity (e.g., given and surname) of the individual, and could grant access to restricted areas or vehicles based on the anonymized authentication.

Figure 2B:
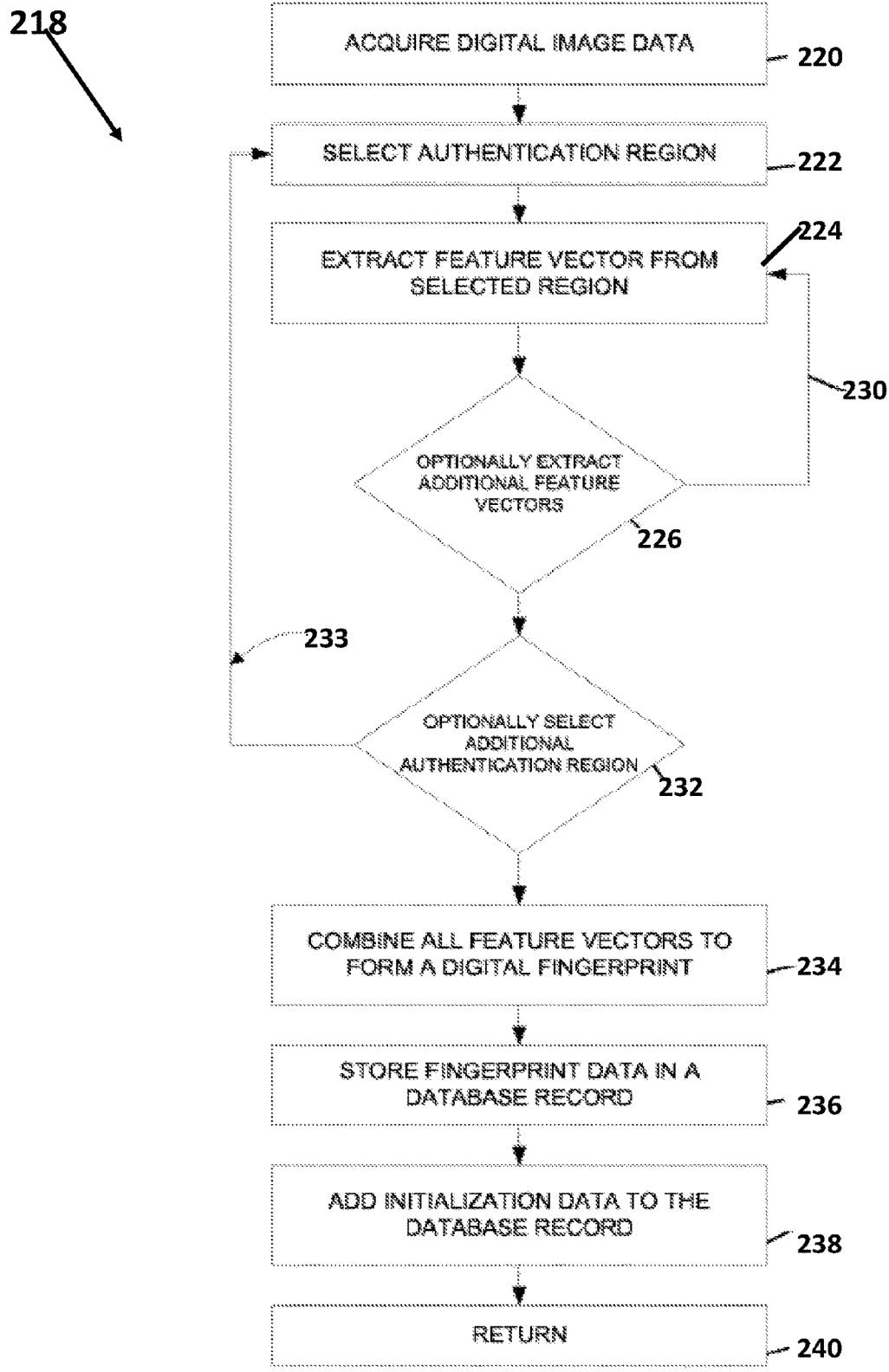

FIG. 2B illustrates a process 218 that includes more robust feature extraction than that illustrated in FIG. 2A, according to at least one illustrated implementation. In this example, the process 218 again begins with acquiring digital image data, block 220. The system selects at least one authentication region, block 222. This may be done by analysis of the image data, analysis of related image data, by reference to a predetermined template that defines at least one authentication region, or other image processing techniques. The system then extracts a feature vector from the selected authentication region, block 224. A feature vector may be used to represent features of a region in a more compact form. For example, a feature vector may comprise an array of color or gray scale numeric values corresponding to areas within the selected authentication region. The values may each comprise a sum, average, maximum or other function of the individual values of a corresponding group of pixels forming a sub-part of the region. In some applications, a feature vector may identify a location and shape of a distinctive aspect within a selected region. The system determines, decision 226, if there are additional feature vectors to be extracted from the same image data. If there are additional feature vectors to be extracted, the control returns, path 230, to repeat the feature extraction, block 224. This loop may repeat until all desired feature vectors are collected. Optionally, the system may determine if there is another authentication region to process in the same image data, see decision 232. If there is another authentication region to process, control is traversed back to block 222 via outer loop 233, for further feature extraction with respect to one or more additional authentication regions.

The system may combine some or all of the extracted feature vectors to form a digital fingerprint, block 234, which the system may then cause to be stored, block 236, along with or logically associated with related data, block 238, as mentioned above. The process returns or concludes at block 240. Note that the process shown in FIG. 2B may be performed using mixed-mode acquisitions wherein the mixed-mode acquisitions may include, for example, acquiring a video of a face of a person as the person says a password and acquiring a sonogram of the voice of the person as the person says the password and making a single digital fingerprint using all of the data from different data acquisition modes.

Figure 3:
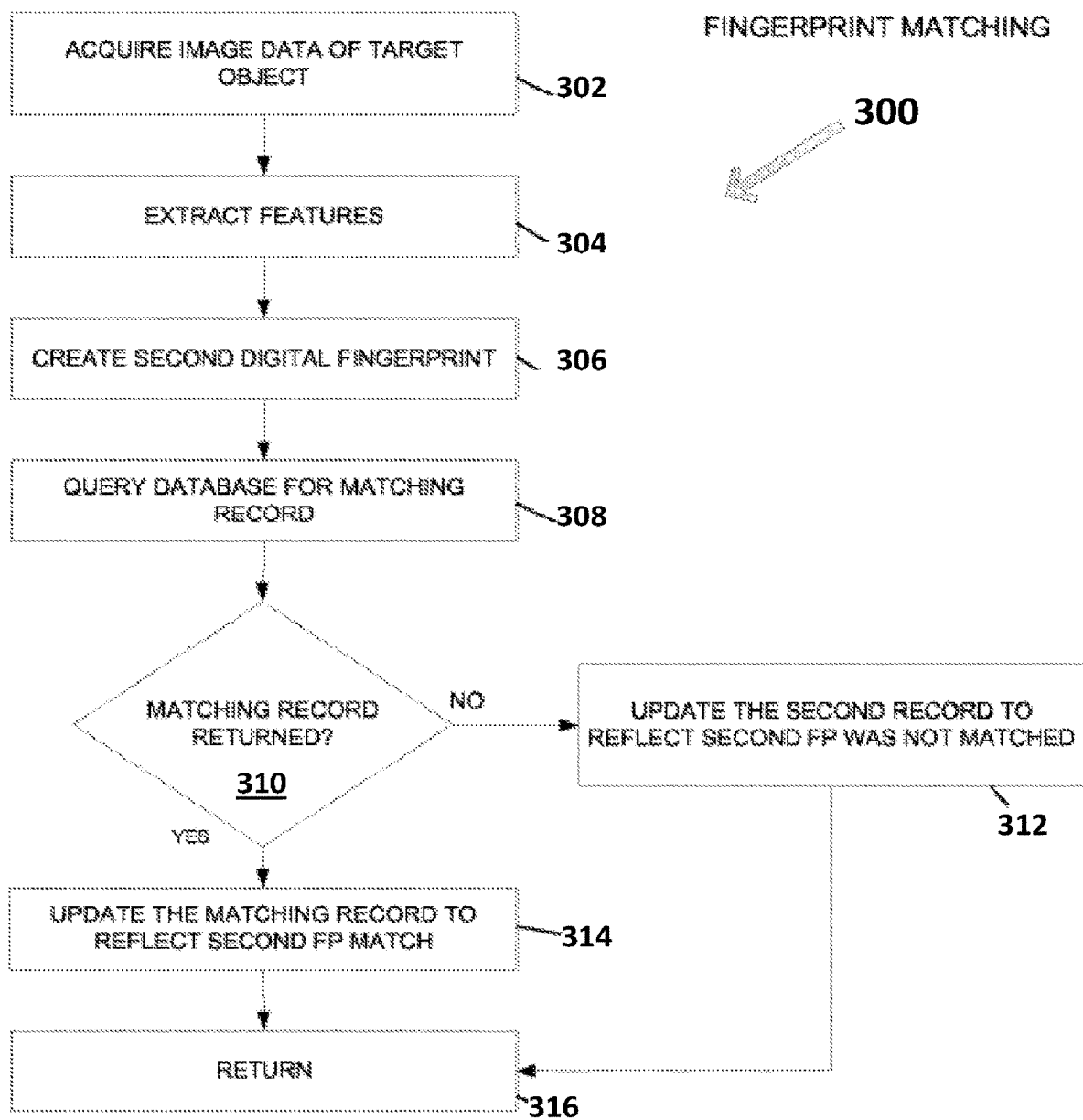
FIG. 3 is a flowchart illustrating a method for matching digital fingerprints, according to at least one illustrated implementation.

FIG. 3 shows a simplified a method 300 for matching a digital fingerprint of a target object to a database of existing or "reference" digital fingerprints, according to at least one illustrated implementation. Here, the system acquires images or image data of a "target object" i.e., the individual (e.g., portion of human face) or other object to be identified or authenticated by finding a match in the database, see block 302. We extract features from the target object image data, block 304, as discussed above. The system then creates a new (second) digital fingerprint based on the extracted features, block 306. The system then queries the dataset, for example a database, block 308, for instance for a record that matches the second digital fingerprint record. "Matching" in this context may be relative to a threshold confidence level rather than a binary decision or to a match confidence level with some other object (e.g., determine that an object is legitimate or authentic when the digital fingerprint for the object matches within a defined tolerance or threshold a digital fingerprint of the reference object (legitimate object). A sample digital fingerprint matching a given reference digital fingerprint may, for example, include sample digital fingerprint matching the given reference digital fingerprint better (e.g., an object that is considerably better) than the sample digital fingerprint matches the reference digital fingerprints of any other object in the dataset). The requisite confidence level may vary depending on the specific application. The confidence level required may be varied dynamically responsive to the data and experience with a given system. If no "matching" record is returned, decision 310, the second record (the digital fingerprint of the target object) may be updated, block 312, to reflect that no match was found. If a match is returned, the matching record may be updated to reflect the match, block 314 (for example, it may be linked to the second record). The results may be returned to the user. The process returns or concludes at block 316. Since each digital fingerprint is complex and the matching process is also computationally intensive, these processes and the overall method 300 in FIG. 3 cannot be performed by a human being nor can these processes and the overall method 300 be performed using pen and paper by a human being. Thus, the method 300 shown in FIG. 3 is a technical process.

As mentioned earlier, a "scan" may refer to an image (or digital data that defines an image) captured by a scanner, a camera, a specially-adapted sensor array such as CCD array, a microscope, a smart phone camera, a video camera, an x-ray machine, or any other device or image sensor that can sense and capture electromagnetic radiation (or any identifying information, e.g., sonar etc., that has traveled through an object, or reflected off of an object, is a candidate to create a "scan" of the object). It is critical to capture at least one native feature of the object, which may be of an original region of the object as distinguished from a region having a feature added to the object for identification, such as a label, bar code, RFID tag, serial number, etc. In some cases, the native feature may of a non-original region in which an object has been added to the physical object for identification (such as a label). The added object may be affixed (e.g., permanently affixed) to the physical object, such as through an adhesive in the case of a label. So long as the added object (e.g., the label) becomes an integral part of the physical object, the system can scan or image the added object to obtain a digital fingerprint and use that digital fingerprint to track the physical object. In some embodiments, the digital fingerprint corresponds to an original region, a non-original region (corresponding to where an object has been added for the purpose of, for instance, identification of the physical object), or combinations thereof.

A "native feature" in this description may not be concerned with reading or recognizing meaningful content, even in the case where the digital fingerprint corresponds to a non-original region. For example, a label on a scanned object with a printed serial number may give rise to various features in fingerprint processing, some of which may become part of a digital fingerprint feature set or vector that is associated with the object. The features may refer to light and dark areas, locations, spacing, ink blobs, etc. This information may refer to or be inherent in the printed serial number on the label (e.g., differences in the way a particular character is printed from object to object), but there is no effort to actually "read" or recognize the printed serial number (which may not be legitimate). In other implementations, this inherent information is used in addition to information represented by the printed serial number. Similarly, an RFID tag applied to an object may give rise to a fingerprint vector responsive to its appearance and location on the object. However, in some examples no effort is made to actually stimulate or "read" data or signals from the tag. In some embodiments the system is not using the added object according to the tracking scheme from which it originated. The various features used in fingerprint processing, some or all of which may become part of a digital fingerprint set or vector that is associated with the physical object, may be extracted from a permanently affixed label (for the purposes presented here the contents of the label, e.g., the value of the serial number may be irrelevant).

As mentioned above, the at least two digital fingerprints of an object that are being matched as shown in FIG. 3 may have been acquired under different conditions which can result in the match failing or taking a longer time than is desirable or permitted for a particular use case. As mentioned above, the disclosed method may incorporate one or more transform pyramiding techniques to improve the above technical digital fingerprint matching process.

The Hardware

FIG. 4 show a kiosk facial imager system 401, according to at least one illustrated implementation. It illustration is not to scale and is meant solely to represent some of the components of the exemplary kiosk facial imager system. A production system would likely be quite different in appearance.

Kiosk Facial Imager System

FIG. 4 shows a six-camera version of the kiosk facial imager system 401. Each camera 410 is relatively high-resolution cameras (e.g., with a respective 20-50 megapixel image sensor) that are aimed at a center of a head of an individual. The cameras may include mechanical and/or image processing autofocus systems to automatically focus on a surface of a face of the individual being subjected to digital fingerprinting. Large portions of the face are seen by at least two, and preferably four or more cameras.

Lighting is provided by the two flat-panel lights 420 shown in the middle of each side. They provide broad-spectrum, uniform lighting that is bright enough to overcome most ambient light but not bright enough to be uncomfortable.

The small display 430 at the top center provides the user with feedback on what the camera system sees. In using the system the user centers himself in the field of view and moves forward and back until his face largely fills the screen.

The kiosk itself adjusts for the user's height, moving up and down until the person is centered in the collective field of view of the cameras. This adjustment is currently manual, but will be automatic in any deployed system.

The system is controlled by a local computer 110. Processing of the acquired images can occur locally or in the cloud but consists principally of the following acts.

Images are captured from multiple viewpoints. The figure shows six cameras, but the exact number is not critical. The captured images are used to form a depth map of large portions of the object. Locations too far away (i.e. background) to be part of the face are automatically removed from all images (or from the resulting digital fingerprints—the effect is the same).

The images are mapped to the surface of the model with overlapping areas adjusted for differences in non-Laplacian reflectance in the individual images to assure uniformity across the model. This approach avoids artifacts caused by differences in apparent luminance in the images captured by different cameras and artifacts at the edge of overlapping fields of view. Other modifications may be made to the model as described in U.S. application Ser. No. 16/045,642, filed Jul. 25, 2018, which claims the benefit of U.S. Provisional Application No. 62/536,496, filed Jul. 25, 2017.

Once the full model is complete, both the individual images (2D digital fingerprinting) and the model (3D digital fingerprints) are digitally fingerprinted. If this is an induction acquisition, the person supplies whatever information required by the system operator, that information is linked to the digital fingerprints, and the results are stored in a reference database for later access.

If this is an authentication acquisition, the digital fingerprints are sent to the authentication system, match results are obtained, and the system operator presented with the results. What other data is recovered from the reference file and what the system operator does with the matching and retrieved information are outside the scope of this disclosure.

Face Imager Components

Figure 4A:
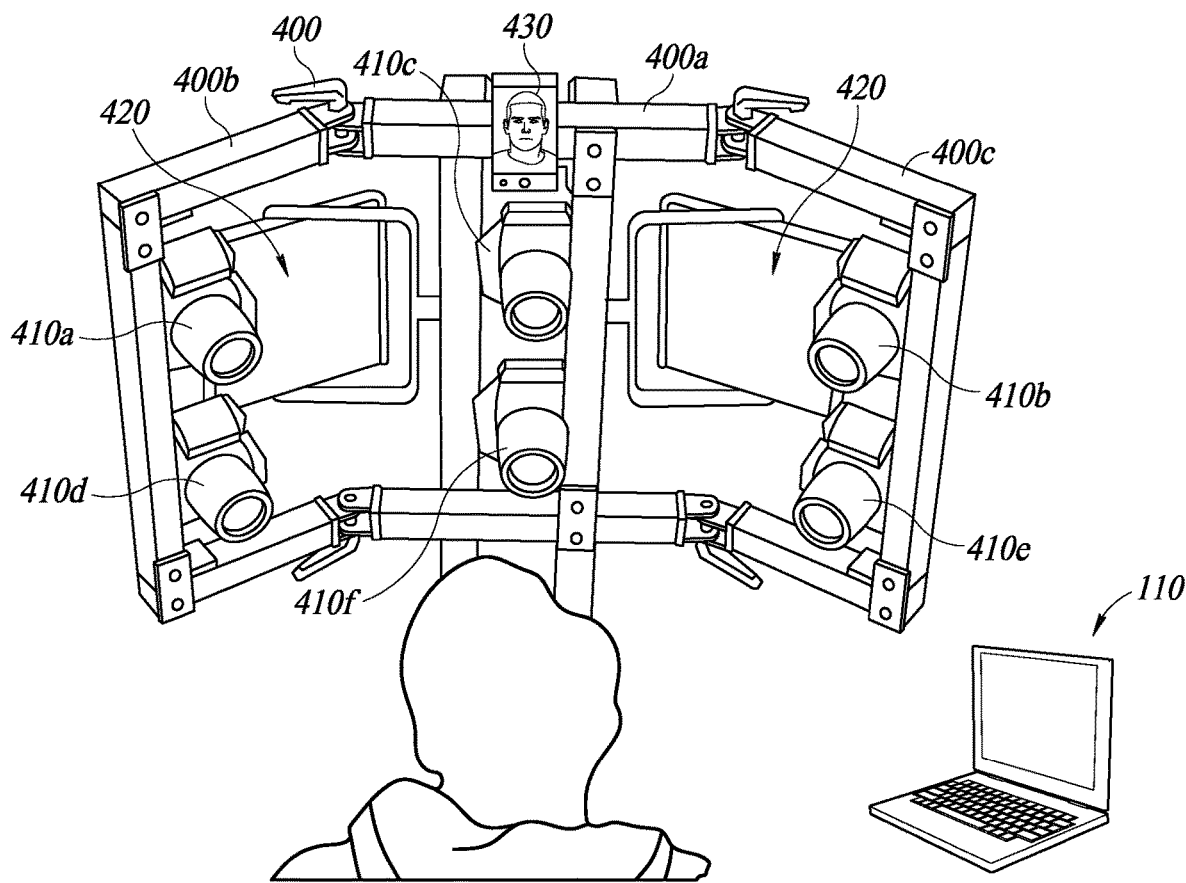
FIG. 4A is an isometric view of an exemplary kiosk system for authentication using facial biometrics, according to at least one illustrated implementation.
Figure 4B:
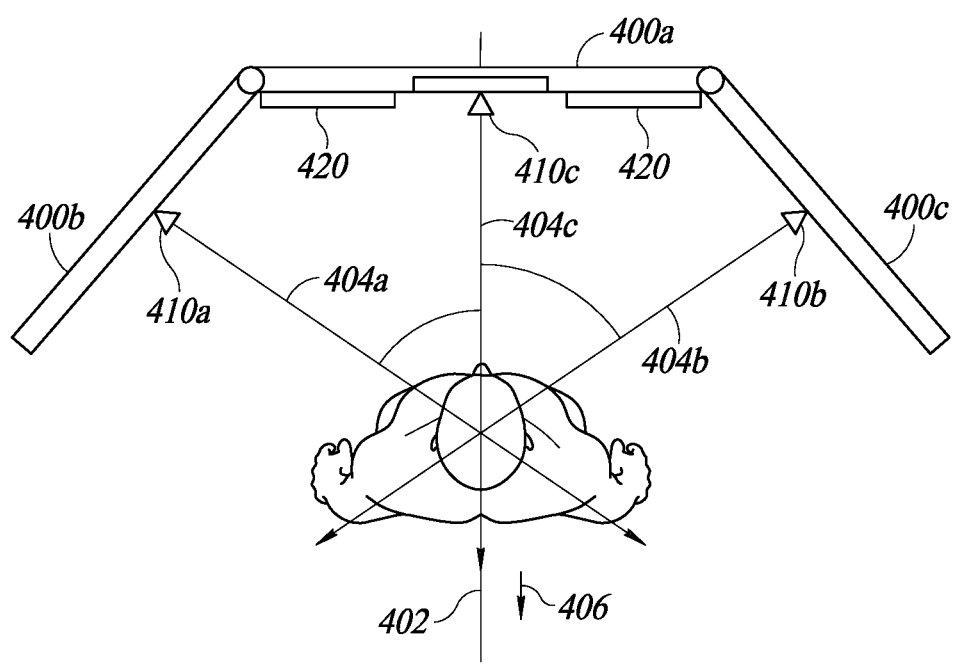
FIG. 4B is a top plan view of an exemplary kiosk system of FIG. 4A.

As shown in FIGS. 4A and 4B, the kiosk system includes a frame 400 which may take the form of an adjustable-radius structural arc to allow for multiple image sensor (e.g., multi-camera) alignment with variable distance and field-of-view. The frame 400 may include a central portion 400a, a first wing portion 400b, and a second wing portion 400c. The frame 400 may have a center plane 402 (FIG. 4B, e.g., a vertical plane) that bisects the frame. The first wing 400b is on a first side of the center plane, and the second wing 400c is on a second side of the center plane, the second side across the center plane from the first side. The first wing 400a may extend from a first end of the central portion 400a. The first wing 400a may, for example, be pivotal coupled to the central portion 400a by a hinge or joint to rotate about an axis (e.g., vertical axis) with respect to central portion 400a, and may include a lock or clamp to secure the first wing 400b in an angular position with respect to the central portion 400a. The second wing 400c may, for example, be pivotal coupled to the central portion 400a by a hinge or joint to rotate about an axis (e.g., vertical axis) with respect to central portion 400a, and may include a lock or clamp to secure the second wing 400c in an angular position with respect to the central portion 400a.

The exemplary kiosk system includes one or more high-resolution image sensor (e.g., cameras 410 with high-quality optics) are arranged within the adjustable radius structural arc of the frame 400. The high-resolution cameras 410 may be arranged in any pattern or orientation and the kiosk system may include any number of high resolution cameras 410. The exemplary kiosk system shown in FIGS. 4A and 4B includes six Canon EOS 80D high cameras. The exemplary kiosk system also includes one or more processors communicatively coupled to the image sensors, and one or more non-transitory processor-readable storage medium communicatively coupled to the one or more processors. The non-transitory processor-readable storage media stores processor-executable instructions, executable by the one or more processors to perform the methods, processes, and algorithms described herein.

In the illustrated implementation, a first image sensor (e.g., camera 410a) is mounted to the first wing 400a. The first image sensor (e.g., camera 410a) has a first field of view that extends along a first principal axis 404a that intersects the center plane 402 of the frame 400 at a first positive distance outward along the center plane 400 in a first direction 406 (FIG. 4B) from the frame 400. A second image sensor (e.g., camera 410b) is mounted to the second wing 400c. The second image sensor (e.g., camera 410b) has a second field of view that extends along a second principal axis 404b that intersects the center plane 402 of the frame at a second positive distance outward along the center plane 402 in the first direction 406 from the frame 400. The second distance may be equal to the first distance. A third image sensor (e.g., camera 410a) is mounted to the central portion 400a of the frame 400. The third image sensor (e.g., camera 410c) has a third field of view that extends along a third principal axis 404c (FIG. 4B) that extends along the center plane 402 in the first direction 406. In some implementations, a fourth image sensor (e.g., camera 410d) is mounted to the first wing 400a of the frame 400. The fourth image sensor (e.g., camera 410d) has a fourth field of view that extends along a fourth principal axis that intersects the center plane 402 of the frame 400 at a fourth positive distance outward along the center plane in the first direction 406 from the frame 400. A fifth image sensor (e.g., camera 410e) is mounted to the second wing of 400c the frame 400. The fifth image sensor (e.g., camera 410e) has a fifth field of view that extends along a fifth principal axis that intersects the center plane 402 of the frame 400 at a fifth positive distance outward along the center plane 402 in the first direction from 406 the frame 400. A sixth image sensor (e.g., camera 410f) is mounted to the central portion 400a of the frame 400. The sixth image sensor (e.g., camera 410f) having a sixth field of view that extends along a sixth principal axis that extends that extends along the center plane 402 in the first direction 406. In at least some implementations, the first image sensor (e.g., camera 410a) and the second imager sensor (e.g., camera 410b) are laterally spaced from one another across the center plane 402 by a distance sufficient to capture partially overlapping images of a face when the face is positioned at a point at which the first principal axis 404a and the second principal axis 404b intersect the center plane 402. Likewise, the fourth image sensor (e.g., camera 410d) and the fifth imager sensor (e.g., camera 410e) may be laterally spaced from one another across the center plane 402 by a distance sufficient to capture partially overlapping images of a face when the face is positioned at a point at which the first principal axis 404a and the second principal axis 404b intersect the center plane 402. Notably, when a face is positioned at a point at which the first principal axis 404a and the second principal axis 404b intersect the center plane 402, the first principal axis 404a intersects a Sagittal plane of the face at a non-zero acute angle and the second principal axis 404b intersects the Sagittal plane of the face at a non-zero acute angle, to capture images from both sides of the face.

The kiosk system also includes at least one light source mounted to the frame 400 and oriented to project light outwardly in the first direction from the frame. The at least one light source may take the form of one or more adjustable lighting panels 420 (e.g., bi-color LED lighting panels) to allow for variable color temperature and brightness. Any number and or arrangement of adjustable lighting panels 420 may be included in the kiosk system. The exemplary system shown in FIG. 4 includes 2 bi-color LED adjustable lighting panels 420. The lighting panels 420 are positioned and oriented on the frame to 400 provide a balanced light field to a human face when the human face is positioned at a point at which the first principal axis 404a and the second principal axis 404b intersect the center plane 402.

To adjust the height of the various components, for instance the image sensors (e.g., cameras 410a-410f) to accurately capture faces of subjects having different heights, the kiosk system may include a height-adjustable lift. The height-adjustable lift may be manual and or automatic and is positioned below the picture in the exemplary kiosk system shown in FIG. 4.

Control and data wiring may connect one or more components of the kiosk system to enable both simultaneous image capture and data transfer to PC. Physical camera distance and radius of adjustable camera-mount arc helps to maximize orthogonal camera coverage over much of the object's surface, resulting in true undistorted feature capture for surfaces orthogonally under each given image sensor (e.g., camera 410a-410f). Software processing can further improve clarity of surface features by de-warping the distortions caused by non-orthogonal image capture. A small screen display 430 may be attached to the central portion 410a of the frame, and operated to present a live preview to assist subject alignment in the center of the respective fields-of-view of the image sensors (e.g., cameras 410a-410f). The display screen 430 has a display surface that is centered about the center plane 402 and visible from a positive distance along the center plane in the first direction 406.

Camera Positioning

Each of the camera images a particular region of the subjects face from an angle roughly orthogonal to the surface of the region captured. By positioning cameras such that they maximize orthogonality to the planes of the face, the larger flat regions of the face can be imaged more consistently. These regions of the face are less susceptible to deformation, and prove to yield the most consistent image features between acquisitions of live subjects. Image capture regions are selected such that each portion of the image is viewed from itself and the two nearest neighboring cameras. These overlapping image regions create a correspondence between multiple viewpoints, allowing us to construct a 3D model containing very accurate contours of the subject's face as well as high-resolution photo-detail texturing the surface of the model.

Face detection+via RGB or live structured light device can be used to automatically raise/lower the imaging rig such that the subject is approximately centered within the field of view of the cameras. This could also be used to programmatically crop out background from each of the rig cameras, which improves the quality of the digital fingerprints as well as the 3D model. Automation of camera view angle, arc radius, zoom amount, cropping, and/or field-of-view overlap can be implemented to enable more versatility for the imaging system.

Focus

Cameras can use auto-focus with multiple iterations in order to focus on the face. Using an approximate head location within the field of view (FOV) of the rig, we can preprogram the cameras to favor focusing on particular of their respective FOVs (generally center). If auto-focus is inconsistent, one can iterate several times, picking the one with the greatest central area in focus. Determination of region in focus could be done with blur subtraction or some other method.

With properly determined auto-focus, data quality is significantly improved and homogenized. Live subjects can vary significantly in their abilities to maintain optimal imaging posture or position. Fast automated image capture control, such as autofocus, helps control for this variation. Cameras can use fixed-focus with more rigid parameters regarding face positioning. We can use focus detection algorithms to determine image quality, which could be used to instruct the use on how better to position themselves in the rig FOV.

Focus assessment can be used in image processing to segment out the subject's face from any extraneous out-of-focus detail such as backdrop. This streamlines the digital fingerprinting process as well as 3D model creation.

Corridor System

Figure 5:
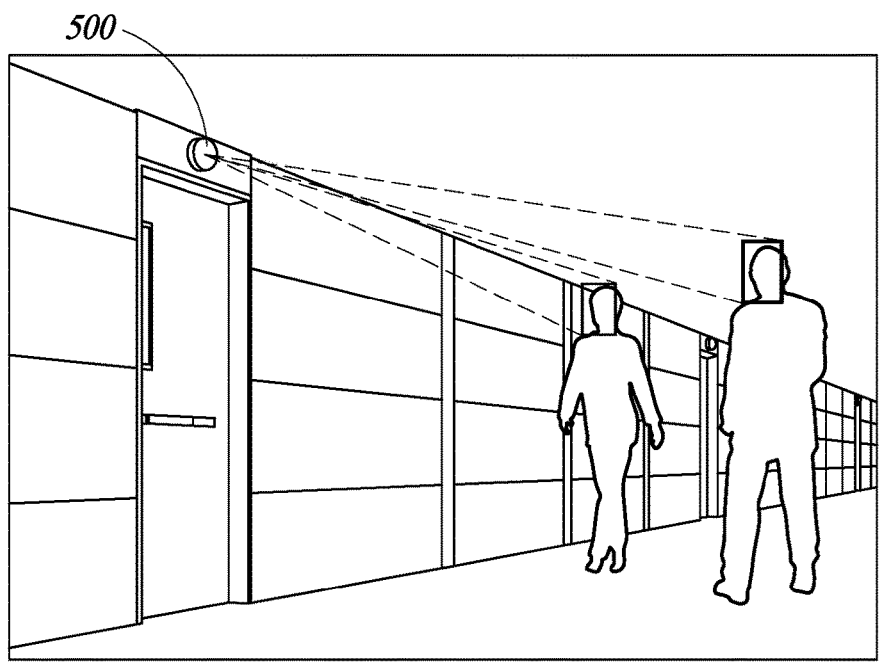
FIG. 5 is an isometric view of an exemplary corridor system for authentication using facial biometrics, according to at least one illustrated implementation.

FIG. 5 illustrates an exemplary corridor system 500. The corridor system 500 may be used to authenticate a previously-inducted person while they are walking down a corridor, hallway, or other space. The corridor system 500 may be used, for example, to enable "Passenger on Premise" programs for airlines that want detect when a preferred customer has entered the airport. The corridor system may also be used to as part of one or more security systems, for example, as part of an airport security system implemented by the transportation security administration (TSA). The corridor system may also be used to determine when a person has bypassed a security system, for example, has avoided a TSA security checkpoint and or has entered a secure space.

The camera system included in a corridor system may include a camera and a computer. The corridor system may use the camera system detect the movement of the person within the corridor by looking for a face in the field of view using machine vision image processing. The camera system may then use the angle and position of the detected face to compute proper optical focus, zoom, and image segmenting, in order to get a high-resolution capture of the face. The corridor system may then extract the digital fingerprint of the image, and compare the resulting digital fingerprint with reference digital fingerprints stored in a reference database. The reference digital fingerprints may be themselves obtained from single-image capture (under conditions where the person's identity, badge number, or other means of determining which person is before the system), from single images captured during a kiosk induction, or against the full model built from the multiple images captured at a kiosk induction. Additionally, the angle and position of the captured face image can be used to constrain the feature detection to a specific region of the full 3D model of the face captured at a kiosk. This speeds up processing by reducing the space potential matches that might be found in the reference database.

The corridor system may detect and authenticate each of the subjects within the corridor to determine their privileges to enter a given space, prior to the time they physically walk to the entrance to said space. Any subjects occluded during their walk down the corridor would then be prompted for a close-range authentication test upon their arrival at the door. Details of how the digital fingerprints captured from either system are compared to the reference prints will be discussed below.

Information Capture (Image and Depth)

Two forms of image capture (from which images the digital fingerprints are extracted) are particularly in view in the teachings of this disclosure: 3D acquisitions and 2D acquisitions. The 3D acquisitions can be captured in several ways, including by RGB-D cameras, multi- or dual-camera stereo, focus matching, and by other ways known in the art. The particular system described here captures high-resolution images using multiple cameras and combines them to produce a 3D map of the face with high resolution in both the image and pixel positional information. Other methods and combinations of methods of getting such images and the 3D positional information of the points of interest are in view in this disclosure.

The taught system images the face from multiple angles with high-resolutions cameras. Nearly all of the face can be seen by at least four cameras. Even though two cameras are enough to calculate the depth information, greater accuracy is achieved by using more cameras. The FIG. 4 shows six cameras though what is taught here can be done with more (resulting in coverage of more of the side of the face and better matching of 2D to 3D) or with fewer (resulting in coverage of less of the face, more difficult 2D to 3D matching, but a less expensive and potentially faster system). In most embodiments of this invention six cameras provide a useful compromise among angle of capture, model accuracy (particularly 3D coordinates of surface points) and system cost.

For 3D to 3D matching, images are captured by all six cameras, with the goal being that at least 4 cameras see the great majority of the face. For 3D to 2D matching the 3D capture is the same but 2D matching is with a single camera. The three-dimensional location of points on the surface of the object may be determined by the multi-stereo approach, through the use of depth (RGBD) cameras, through focus stacking, or by other means. Multiple means may be used at the same time to get more accurate surface position characterization.

Handling Differences in Focus

The strong three-dimensionality of the face, its malleability, and movement by the person make it difficult to capture each area of the object with focus uniform between different acquisitions. The normal effect of blur on a point of interest's detected "size" is to increase the detected size as blur increases. This is primarily caused by loss of small-scale detail with increasing blur. Because of this, and because with strongly 3-dimensional objects blur differences in different image acquisitions is very hard to avoid, our custom point of interest detector is configured to be relatively insensitive to focus blur. This can be accomplished in several ways. One way is to use a uniform size for all point of interest regions that are characterized. In the absence of knowledge about the on-object resolution, this approach leads significant scale-space problems since it can confuse similar but different sized regions on the object and miss identical (but captured at different resolutions) regions on the correct object.

More generally, there is a tradeoff between eliminating differential blur and getting the scale of the point of interest features correct. The better differential blur is handled, the more sensitive the system becomes to changes in on-object resolution. This tradeoff can be avoided by building models of the object based on the multi-camera stereo imaging or other methods so that we know the exact relationship of pixels in the object to the camera. We can, for example, ensure all points of interest are located and characterized from a recalculated viewpoint of 24 inches from the center of the patch and looking straight down on its center. Because we now know the scale at every point, there is no need, when comparing two acquisitions of the same object, for point of interest detector scale invariance. We can therefore use a point of interest system that is focus difference resistant even if it means sacrificing scale independence.

This is another advantage of the technology presented in U.S. application Ser. No. 16/045,642 entitled "Model-Based Digital Fingerprinting". Having a model of the object and digitally fingerprinting that model makes irrelevant many variances in acquisitions without requiring algorithms that are themselves invariant (and hence less able to distinguish differences) than more sensitive ones.

Model Building

The teachings in Alitheon U.S. application Ser. No. 16/045,642, entitled "Model-Based Digital Fingerprinting" are relevant here. In particular, this application teaches the concept of creating a digital fingerprint of a model of the object (rather than directly of images of the object) and provides the definitions of what is meant by a model. The definitions of a model included in this disclosure application are used throughout the description herein. Most embodiments of this application use model-based digital fingerprinting technology because it results in a digital fingerprint less subject to variation based on illumination, angle of acquisition, distance, blur, and so on than one based solely on images as they are collected. Creating of such a model also enables one method of 2D to 3D matching taught in this disclosure.

Locating Points of Interest

Points of interest are positions on (or within, though not for this disclosure) the object where "something interesting" is happening and that can be reliably found again on multiple acquisitions of the object. In other words, they must be locatable and repeatable. They must be repeatable so we can link two acquisitions of the same object through them. The must be locatable (e.g., a point at a corner vs a point on a line, with the former being locatable and the latter not) so that we know that the points we are linking are in fact corresponding points in the different acquisitions.

Points of interest are used for two different purposes under the teachings of this disclosure. They are used to link images from different cameras taken at the same acquisition into a stereo view, and they are used to match two different acquisitions of the same object. The most important characteristics of a point of interest, clearly seen in both these uses, is that it can be unambiguously located in multiple views of the same object and that, having been so located, it can be distinguished from other points of interest reliably. Reliably here means either in its characterization (i.e., it simply looks different from others) or in location (i.e., it is in the right spot geometrically relative to other points of interest so that the pattern of such points is duplicated in another view of the same object—whether for stereo matching or for authentication matching or both).

The above discusses finding places on the object that have a high likelihood of being replicated in other acquisitions of the object. It is also important to assign globally-relevant location information for the points that are found. As described herein, "globally-relevant" means measured with respect to a coordinate system external to any particular image of the object. The exact external coordinate system used is, is not particularly relevant, though one exemplary coordinate system that may be used includes a coordinate system having three axes including the camera-object line, vertical, and horizontal to the right (from the camera's viewpoint) is certainly acceptable.

Once the coordinate system is defined, each point on the individual images of the object must be mapped from the local on-image two-coordinate system to the global three-coordinate system. There are many ways known in the art to do the mapping. Generally, mapping techniques consist of finding points of interest shared among the overlapping image pieces and determining from their position in the images (local 2D coordinates) and (possibly) knowledge of the geometry of the camera-object system their global coordinates in three-space. The point of interest detection, characterization, and matching capabilities discussed elsewhere in this description provide a good set of such points of interest. The location in the global coordinate system for each point should be known as accurately as possible since, many features of the object will be derived from them.

Repeatability

These localizable points of interest would be of no value for aligning or matching images were they not to appear in multiple images of the object. In other words, the desired points of interest must be repeatable. Repeatability and localizability are extremely important for both matching images taken of the object at the same time and matching images taken at different acquisitions. To be repeatable, a point of interest must have very similar feature vectors across images and acquisitions and, in most embodiments, also appear (up to some allowed transform) in the same place. This should be true even in the presence of considerably different acquisition conditions. Repeatability often requires normalizing out changes likely to occur, such as absolute illumination, blur, scale, angle of view, and distortions in the object itself.

The benefits of the teachings of this disclosure are achieved by the system as a whole and are not necessarily achievable by any part of the system alone. In particular, how the system handles variation in illumination. Experience teaches that neither the hardware nor the software alone is sufficient to achieve useful illumination insensitivity, but both together work well. The hardware plays its part by providing uniform illumination from multiple angles so that the features on the surface of the object appear as nearly the same as possible. This alone is insufficient—some parts of the system (e.g. the 2D imagers) are not part of the kiosk and capture their images using ambient light—but it does help. It helps not only in controlling for the level of illumination but also in its variation across the object—such as the lights, camera, and object at induction being carefully placed to avoid shadows—something hard to do while imaging changeable three-dimensional objects.

Attempting uniform and diffuse illumination is not sufficient, however. First, on a moving, changeable three-dimensional object, perfectly uniform illumination is very hard to achieve in a single acquisition and nearly impossible across two. Second, in systems where there can be significant asymmetries in acquisition conditions (e.g. kiosk induction and corridor authentication), such high-quality illumination may be impossible. A 2D acquisition done with ambient fluorescent light can look very different from one done with controlled LED lights synced to reflectance sensors, for example. As a result, the extraction algorithms that determine the characteristics (and hence the feature vector) of points of interest normalize out variations in illumination that take place over scales larger than the (generally very small) regions from which a point of interest comes. Neither hardware alone nor software alone within the taught system works well enough, but together they do.

Another illumination-centric function is how images are merged when creating the model of the face from which we extract digital fingerprints. Faces do not show purely diffuse (Lambertian) reflection, therefore, images of the same part of the face taken by cameras in different positions may show substantially different light levels even under the same illumination. In order to cover the model with an image, we have to merge these overlapped images to form a single image from which the points of interest are extracted. There are many ways to do this but taking pixel-by-pixel average or median proves to be quite effective. Even better results are obtained by weighting each pixel by its distance from the edge of the field of view. This avoids artifacts (and hence spurious points of interest) at the edges of the regions seen by a particular camera.

Another way the taught system normalizes out changes in illumination is to make the feature vectors of the points of interest insensitive to absolute illumination. The features we us—binary gradients—have such insensitivity.

Localizability

A minimum requirement for a good point of interest is that its location on the image or model not be ambiguous, that its coordinates can be determined to within a small tolerance. This must be true on both acquisitions (i.e., the one in the reference set and the one being tested or on both images being aligned from a single acquisition).

Point of interest localizability is important for two reasons. First, the only way matching two points provides any information that the two objects are the same is if we can be sure the two points are from the same location on the object. Second, in some embodiments (but not all) after points of interest are filtered by measuring the vector differences between their feature vectors, additional winnowing takes place by requiring sets of points from the same local area have, up to an allowed transform, the same geometric relationship in the two acquisitions.

Well-defined positions of similarly-featured points of interest are needed for the geometric matching (i.e. determining the transform between the two acquisitions and matching in the presence of such distortions). Being able to localize the points of interest helps geometric matching, but the geometric matching also limits the possible locations of matching points of interest to what is physically realizable. In other words, we insist that whatever transform whose parameters we find be physically possible.

Ensuring that matching points of interest are from the same location (up to the allowed transformations in object shape, viewpoint, and so on) on the object is particularly complicated because the possible locations of the point pairs are dependent on the transformation and its parameters while, at the same time, the transformation and its parameters are determined by matching point pairs. This means that whatever points of interest form the match pair set, the two sets must differ by a physically-possible set of transform parameters. Though complex, this two-pronged approach helps guarantee that we have found the correct points and the correct transform. Both RANSAC (or equivalent) and limitations on transform type and parameters simultaneously ensure we have correctly localized both member of each true match pair and that those pairs determine a realistic transform. Where geometric matching is used, this provides another example of the different parts (in this case two algorithmic parts) of the taught system working together to produce better results than either produce alone.

As described below, the points of interest have multiple quantifiable features. One, already mentioned, are their location. Some are the structure of the image in their vicinity. Others, for inherently three-dimensional objects such as faces, are based on shape. All of these can help localize a point of interest—and therefore make it at least a candidate to become a strong match.

The property of localization with respect to different features is important, and may be analyzed from several perspectives. The easiest is in the luminance of the surface. For simplicity, we will discuss monochrome images, but it should be noted that the different color planes can each provide such localization. Consider a white spot on a black background. In all directions from the center, the image gets darker. Provided the spot is of a scale the point of interest detector can find, there is no question where the spot is located. Now consider a corner such as where two perpendicular line segments end. Although the image is uniform within the line segments and also uniform (but of a different value) outside them, the corner is still easily localizable because in most directions there is a sudden change in value at the corner.

Points on lines or on curves of radius much larger than the characterized region cannot be localized because there is no comparable change in value along the line or curve. One point on such a line or curve looks much like any other and so is not a good candidate for a match pair. Similarly points within uniform regions of the image are not localizable since there is little or no change in any direction.

There are many ways to find localizable points of interest. A practical and commonly used one is to take the Laplacian of the image values and filter the image by locations where the absolute value of the Laplacian is both large and substantially larger than at neighboring locations. A different but related approach to the Laplacian is to calculate the Hessian matrix at every point. The Hessian is the matrix of the second derivatives of the function. Once the Hessian has been calculated, candidate points are where the determinant of the Hessian is large in absolute value (and larger than elsewhere in the neighborhood). Then find the eigenvalues of the function at such candidate points. If those have the same sign, are of roughly the same magnitude, and if that magnitude is large enough, they mark places where the "curvature" of the image function is substantial and falls off in all directions. The localizable shapes mentioned above—dot on a contrasting background, a corner and others such as a plus sign—all have Hessians that meet these criteria. There are other methods for finding such locations, but the Hessian approach is generally satisfactory.

Points of interest found using features other than from monochrome images. It isn't, of course, merely monochrome image pixel values that can be used to determine localizable points of interest. A red spot on a green background where both colors have the same luminance (and hence the spot doesn't show up in a monochrome image) is a trivial example, but all the features characterized in a point of interest feature vector are candidates, either individually or working together. One set of features particularly useful in face authentication (and elaborated on later in this disclosure) comprise the shape features of the surface. The curvatures at curvature extremal points are example features.

Above, in the discussion of the Hessian, we mentioned that in luminance space a white dot on a black background, for example, shows high degrees of "curvature" (that is, uniformly high second derivatives that are locally extremal). With shape features, the curvature is a physical characteristic of the surface and places where it is both significant and approximately uniform in all directions (at the proper scale) are localizable and make good points of interest even if the image is uniform across that location.

Not only can the features each provide possible localizable points of interest on their own, they can provide them in concert. A point where color shows extremal curvature in one direction and shape shows it in an orthogonal direction would likely produce a localizable point of interest.

Features Extracted

The section discusses various features we use in performing biometrics. In particular, this section describes how features that are used to characterized the points on interest found using the process described above. The specific features that go into the feature vectors of the points of interest so that match pairs can be determined are also described.

Characterizing Points of Interest in Each 2D Image

The scale and or size of a point of interest is estimated via scale space analysis of response values of various image operators. Image operators include but are not limited to point operators such as Laplacian and Hessian operators, image region operators such as Harris and other moment operators, corner detection operators, and image convolution operators, custom or otherwise. The "size" of a point of interest, i.e. that which ultimately defines the total region of the image surrounding the point of interest to be used in characterization and orientation estimation, is computed by applying a multiplicative factor to the point of interest scale. Said multiplicate factor is optimally trained to produce the highest degree of accuracy/discrimination in point of interest matching.

[Orientation of the point of interest can be computed from the directional intensity gradients calculated at regularly sampled points within a region surrounding the point of interest; point gradients may be weighted by distance from the point of interest, averaged and/or binned for the final orientation estimate. Orientation may also be computed from intensity gradients across multiple distinct point pairs within a region surrounding the point of interest by accumulating the gradient-weighted sum of between-point angles. In another embodiment, orientation may be estimated based on analysis of moments of image intensity or intensity gradient in a region surrounding the point of interest. Many other techniques are known in the art.

As mentioned above, feature characteristics are extracted from a region surrounding the point of interest defined by the estimated size of the feature. Characterization is based on image point intensities, image sub-region intensities, image intensity point gradients, and image intensity region gradients. Multiple methods of creating binary features and optimally selecting the subset to be used in characterization are employed.

Point of Interest Location

The taught system captures multiple high-resolution views of the face from different angles and builds a model of the face from the result. The digital fingerprints of each such image can determined separately and used for individual image matching (2D vs 2D and some forms of 2D vs 3D) as described below. When the points of interest appear in multiple images, however, they can also be used to determine the locations of those points of interest in the global (3-space) coordinate system using standard multi-camera stereo matching techniques. These points of interest, positioned now in three dimensions, form the skeleton of the model of the object we are building. We can now do two additional things. First, using interpolation, spline fitting, or other such means, we can determine the coordinates of each pixel on the entire visible (by enough cameras) surface. Second, we can merge the images at each point to give a uniform and, so far as is possible, artifact-free image of the entire surface. When complete, each point on the model has assigned to it a set of color values and three positional coordinates. In addition (see the Model-Based Digital Fingerprinting disclosure), additional features of the model may be determined (such as the angular distribution of non-Lambertian reflectance vectors).

The set of points of interest found may not be optimal for characterizing the object. Among other things, the point of interest characterizations were derived prior to cleaning up the image and without regard to such things as angle of view. The following sections describe how to improve the point of interest set.

Characterizing points of interest on the surface of the model. Several improvements in the point of interest set found above can be made now that we have a model of the object that has a smooth image applied to its surface and whose pixel coordinates are now known. We have, by the way, used multiple high-resolution images both to determine the 3D coordinates and to create the reduced artifact image so that the approaches described in this and following sections work with high accuracy. This is another way the hardware is designed with the software in mind and the software takes advantage of what the hardware can do. The following sections discuss this characterization.

Averaging characterizations. In one embodiment we simply average (or take the median) of the characterizations of the each point of interest that was used to align the images into the stereo view of the object. We already know this is going to give pretty good results since the points of interest in the original images were close enough to allow matching.

Extracting from the model in three dimensions, given point of interest location. In one embodiment we use the three-dimensional positions on the surface of the model of the matched points of interest but re-extract their image-based characteristics. In other words, we keep the same set of points of interest, but recharacterize their image-derived features as follows. We take the surface normal at that location (see below) and project the image onto the tangent plane (the plane perpendicular to that normal vector). We then re-extract the image features from this new image (using the same techniques outlined above that characterized the points of interest in the individual images). This has several advantages over using the original characterizations, including, for example, the advantages described below.

First, the new extraction has, to first order, no scale, rotation, affine, homographic, or perspective, projective, or higher-order distortion while the original image, being captured fairly close to the face, likely has all of these distortions. As a result, matching points of interest taken from the model requires much less tolerance for variability. Experiments have repeatedly revealed that the greater the level of invariance that needs to be achieved in the characterizations of the points of interest, the less well those points of interest distinguish different objects from the correct one. This model building and subsequent recharacterization demonstrate again the advantage of the combination of techniques taught in this disclosure.

The distortions mentioned here are not those that must be corrected in order to get geometric matches. Those are distortions in the locations of the different members of candidate match pairs. Instead I am speaking of the distortions within the region from which the image-based features of each particular point of interest were derived (that is, over a generally much smaller region). This may be viewed as the intra-point region rather than the region containing multiple neighboring points.

Additionally, the point of interest characterizations are based on the smoothed image created from all the matching images, rather than on just one of them, and hence likely has greater consistency (and hence a greater likelihood of matching correctly). The merging process also likely removed spurious points of interest near the image boundaries.

Relocation and extraction from the model in three dimensions. In another embodiment we again start with the model but this time, instead of using the already-found locations of the points of interest and recharacterizing the region around them, we re-find the points of interest using the surface images viewed down along the surface normals and then characterize them using the same methods as in the previous paragraph. We can find them using the local Hessian of the illumination or by other image-based means. We then characterize them as before, but this time using the image as seen in the tangent plane rather than the image as seen in the focal plane of any particular camera.

Add shape features to existing points of interest. Using the techniques taught below or others we can characterize shape features of the object around the existing points of interest (however found) and add those characterizations to the image-based features of the points of interest.

Find new points of interest based on non-image information. In this embodiment the stable extremal points of the new features, or combination of the new and old features, are used as points of interest.

As described herein "curvature", refers to one of two related things: the actual curvature features (derived below) or the measure of the way the second derivatives of whatever feature (including, as above, luminance) behaves. Above we calculated the "curvature" of the luminance, choosing as point of interest places where the curvature is extremal, strong in all directions, and of the same sign. Now, below, we will calculate the shape of the surface where the actual curvature is what is important. It should be noted that the tensor equations derived below for the physical shape of the object are equally applicable to the space of luminance values and to any combination of features that have been cast into a feature vector. Once we have found the new locations with extremal "curvature" values, those locations become candidate point of interests.

3D Features

Depth data can be established via multiple means, for example, using one or more of the techniques described below. 3D can be determined using multiview stereo. For example by using multiple cameras (>3) and following the position requirements stated above, correspondence can be established between the cameras, which, when combined with the known camera positions tells us how far away individual points of interest are from the rig.

Structured light in order to construct a rough model for the face. The model quality in this case is lower than that produced using multiview stereo, but it allows for more disparate camera positions and/or fewer cameras but still allows shape and 3D position features to be captured.

3D information can also be captured by a single video camera if the object is in motion across the field of view of the camera. The multiple images simulate the positioning of multiple cameras, which can be used to establish correspondence and therefore depth data. Once established, one can calculate surface normals as well as the directions and magnitudes of principal curvature for any point at which adequate depth data has been calculated.

Additional Algorithms

Line suppression can be used to restrict the clustering of key points around hair, which is normally quite feature-dense. This allows us to preferentially place points on skin texture. Several line suppression techniques work, but one preferred embodiment requires the two eigenvalues of the Hessian to be quite close to each other. This eliminates points of interest on lines because points of interest on lines tend to have one eigenvalue (corresponding to the eigenvector across the line) much larger in absolute value that the other eigenvalue.

Point of Interest aggregation. Rather than building a model and digitally fingerprinting the model. The points of interest from each image can be used for authentication. Two approaches for doing so include aggregating the digital fingerprints of each image into a single digital fingerprint of the object without first forming a model. Authentication would then be accomplished by comparing the aggregated digital fingerprint of the test object with similarly aggregated digital fingerprints in the reference set. Alternatively, individual image digital fingerprints of one acquisition can be compared against the aggregated digital fingerprints from the other acquisitions.

Alternatively, points of interest for comparison (across all points of interest in all individual images of a particular object) may be chosen to be high response points of interest from the camera seeing the region most nearly perpendicularly. These technique is used in "straight down" digital fingerprinting as described below.

Creating Digital Fingerprints from New Perspectives

If the 2D digital fingerprints derived from flat images (e.g. those captured in a corridor setting) are to be compared the 3D digital fingerprint of a model, the 3D fingerprint must be converted into one or more 2D fingerprints so that the comparison can be done. Several techniques are possible to achieve this including "straight down" digital fingerprinting and "projected" digital fingerprinting.

A "straight down" digital fingerprint extracts the feature vectors of the points of interest as though looking straight down on the surface, while a "projected" digital fingerprint projects the person's head to a sphere, ellipsoid, cylinder, or other shape centered on the center of aim of the camera and of a standard radius. "Straight down" digital fingerprints are generally used in 3D to 3D comparisons while "projected" digital fingerprints are generally used to match digital fingerprints of flat images (e.g. "corridor" acquisitions), though either approach can be used in each application. The surface used in projected digital fingerprints may, in some embodiments, be an "unwrappable" surface such as a cylinder (that is, a shape that has zero Gaussian curvature). Insofar as it is possible, the outward-projected images should look as close as possible to what a camera looking back along that direction would see. The split line (where, the cylinder, for example, is cut in order to unwrap it) should occur in a region where there are few or no important points of interest. This generally means from a direction where there are no cameras to capture an image, such as the back of the head.

The two approaches differ substantially because their primary purposes are different. Projected digital fingerprints are primarily compared with single-image digital fingerprints, therefore, hey do not have any radial (i.e. toward the camera) coordinate, surface normal, or shape features. The points of interest are, in projected fingerprints, located solely based on image-based features, while the "straight-down" fingerprints are also located using the extremal "curvatures" (i.e. Laplacian/Hessian) of all the feature values.

The image-based features are characterized similarly in both cases, though since the images are seen from somewhat different viewpoints, the resulting characterizations will differ. "Straight-down" features are formed from perpendicular views of the model's surface (flat to first order), while projected features are formed looking inward along the radial direction at each point. In general, "straight-down" features have fewer affine, homographic, or rubber sheet distortions to deal with because they always see the surface straight on (at least to first order).

Once the full image has been projected, the images are processed to find the points of interest and their characterizations. The individual corridor image digital fingerprints are compared to the entire projected digital fingerprint for matching. The projected digital fingerprint may or may not be "unwrapped" first.

When the kiosk cameras (or some interpolation among them) have seen the object from the same perspective at induction as the corridor camera does at authentication, there will be a significant region on the projected digital fingerprint that matches (to first order and correcting for the usual positional distortions) the corridor digital fingerprint of the correct object. The main reason for this approach is to produce a single digital fingerprint or set of fingerprints that are easy to compare to the digital fingerprints of flat images.

Derivation of Shape Features

Shape features are used for full model to full model comparisons, because the full model possesses the three-space coordinates of the surface points. The model also has information on the surface image that will be discussed later in the disclose. Matching digital fingerprints with coordinate-derived features may be done the same way as with image-derived features. It consists of finding true and strong match pairs and comparing the numbers of them in various candidate references to determine the best match. Finding the true matches (based solely on the feature vectors) can be done in any of a number of ways but are essentially vector distance comparisons with thresholding using any of a number of methods well known in the art. Finding strong matches consists of doing the geometric matching described in U.S. Provisional Application No. 63/014,680, "Transform Pyramiding for Fingerprint Matching System and Method" filed Apr. 23, 2020, and which is incorporated herein by reference and elsewhere.

Described herein are the coordinate-derived features and how they are determined. Many such features can be derived from the three-space coordinates of the object's surface (as instantiated in the model created from the kiosk images). Some of the ones used in this disclosure are the coordinates themselves, the principle curvatures at the point of interest location, the directions of those principle curvatures, the directions of the surface normal at those locations, and the values of the Christoffel symbols at those locations. Many more will be apparent to those skilled in the art. The coordinates may be readily obtained because the surface normals and the Christoffel symbols are derived in the course of deriving the principle curvatures and their directions, therefore, this section focuses on the derivation of the curvatures. The coordinates may provide information on the locations of the points of interest, the surface normals give us information on the orientation of the tangent plane at the points of interest (related to the first derivative of the surface coordinates and are independent of absolute position), the curvatures give us information on the second derivatives of the surface (and are independent of both local position and orientation, and the Christoffel symbols speak to how the surface changes as we move around on it. Together these give a good representation of the surface, though others are of course possible.

Curvature

This section described the derivation of curvature features and benefits using the curvature features to characterize strongly three-dimensional objects. The math here is presented for the case where "curvature" means the curvature of a surface. It must be kept in mind, however, that the techniques used here are directly applicable to extracting the somewhat more abstract (but equally important) curvature features of other properties such as luminance. That extension is obvious to those skilled in the art.

The surface of a face is a two-dimensional non-linear manifold (surface) embedded in a Cartesian 3-space. Consider an arbitrary curve on a non-linear manifold that is itself embedded in a Cartesian 3-space. Let the curve be parametrized by its arc length. The curvature of that curve is just the norm of the covariant derivative of the local tangent to the curve. This curvature can be decomposed into two parts: the geodesic curvature and the normal curvature. These may be viewed, respectively, as the curvature in the surface and the curvature of the surface along the curve. The normal curvature is the dot product of the covariant derivative of the unit tangent vector of the curve with the local surface normal. The geodesic curvature is the norm of the projection of the covariant derivative of the unit tangent vector onto the tangent space. Since these are clearly orthogonal, the total curvature of the curve is $k=\sqrt{k^2_g+k^2_n}$. The geodesic curvature is a property of the curve itself while the normal curvature is inherited from the curvature of the imbedded manifold. Thus, the geodesic curvature measures how much the curve deviates from a geodesic in the embedded manifold, while the normal curvature is the curvature of the manifold itself in the direction of the tangent vector. In what follows, we are most interested in the normal curvature (i.e., the curvature of the manifold itself).

The extrinsic curvature of the embedded manifold provides the primary shape features used in the teachings of this disclosure. The extrinsic curvature of the manifold at a particular point (such as a point of interest) is determined from the normal curvatures of the curves in the manifold that go through the point. Clearly these curvatures vary depending on the direction in which they are measured. If we pick a point P on the manifold and create a plane that contains the surface normal vector, that plane intersects the manifold in a curve. That curve has curvature within the newly-created plane. That is the curve's normal curvature and the curvature of the embedded manifold in the direction of the tangent vector along the curve.

If we now stay at the same point on the surface and rotate the plane around the surface normal, the curvature of the intersection curve will change as we do so. The minimum and maximum values of those curvatures define the manifold's "principal curvatures" at P. They are generally designated as Kmin and Kmax. From these values can be derived the other two important curvatures of a manifold—the Gaussian and the mean curvatures. The Gaussian curvature is the product of the principal curvatures. Thus $k_G = \kappa_{min} * \kappa_{max}$. The mean curvature is their average:

$$k_M = \frac{(\kappa_{min}+\kappa_{max})}{2}.$$

It should be noted that the principle curvatures contain the same information as the Gaussian and mean curvatures and either make acceptable features for characterizing the surface. We use the principle curvatures because they have specific and determinable directions (unlike the other two), which directions provide further features of the face or other object at that point. Those principle curvature directions are the directions of the tangent vector when the mean curvature is a minimum and a maximum. The shape features disclosed in the teachings of this disclosure therefore include the (X, Y, Z) coordinates of a point of interest, the direction of the surface normal, the directions of the principal curvatures and their values, and the Christoffel symbol values. The Christoffel symbol values are defined below.

It should be noted that there is considerable redundancy in this data—all the other information can be derived from the set of (X, Y, Z) coordinates alone and the direction of the surface normal is just the cross product of the two principal curvatures. The reason we extract and use the curvatures and related features is that they are invariant under changes in the coordinate system (e.g. as calculated when a person turns his face to the side) whereas neither the direction of the normals nor the coordinates of the points of interest have that invariance. In deriving the shape features we start with the parametric surface and its normals and determine the various curvatures using tensor calculus.

Determining the Principle Curvatures

There is ambiguity in direction of the normal (and hence in the sign of the curvatures). We define the normal as being "outwardly directed". It is true that the model may not be complete—cover all $4\pi$ steradians of the object—but the object itself is complete and does have an inside and an outside. This means the object's surface is "orientable" and we can therefore conveniently define the normal as "outwardly directed". Consider a 2D surface of arbitrary (but connected) shape embedded in a Cartesian 3-space. The extrinsic or ambient coordinate system will therefore be Cartesian, while the embedded (intrinsic) coordinate system will not be, since the surface is not flat. At a given point P on the surface, we have a set of ambient coordinates $\vec{Z}_i$, where i runs from 1 to 3, and a set of embedded coordinates $\vec{S}_\beta$ where $\beta$ runs from 1 to 2. We will use Greek indices to refer to the embedded coordinate system and Latin ones to refer to the ambient coordinate system.

Consider the covariant derivative of the $\vec{S}_\beta$ with respect to the $S^\alpha$ (that is, with respect to the intrinsic coordinates). By construction, there is no component of the covariant derivative in the tangent space of the embedded manifold. All components are out of that plane and hence in the direction of the surface normal $\vec{N}$. This means that $\nabla_\alpha \vec{S}_\beta = \vec{N} B_{\alpha\beta}$ where the final term is a coefficient of proportionality between the (unit) normal and the covariant derivative. In words, this means that the direction of the covariant derivative of each basis vector is parallel to the surface normal. We can easily show that is true. Start with the definition of the covariant derivative:

$$\nabla_\alpha \vec{S}_\beta = \frac{\partial \vec{S}_\beta}{\partial S^\alpha} - \Gamma^\omega_{\alpha\beta} \vec{S}_\omega$$

Here $\Gamma^\omega_{\alpha\beta}$ is the Christoffel symbol where $\Gamma^\omega_{\alpha\beta} \equiv \vec{S}^\omega \cdot \partial \vec{S}_\alpha/\partial S^\beta$. If we take the inner product of the above equation with $\vec{S}^\gamma$, we get:

$$\vec{S}^\gamma \cdot \nabla_\alpha \vec{S}_\beta = \vec{S}^\gamma \cdot \frac{\partial \vec{S}_\beta}{\partial S^\alpha} - \Gamma^\omega_{\alpha\beta} \vec{S}_\omega \cdot \vec{S}^\gamma$$

The term $\vec{S}_\omega \cdot \vec{S}^\gamma$ is just $\delta_\omega^\gamma$. Using that to change the upper index in the Christoffel symbol to $\gamma$, we see, using the definition of the Christoffel symbol, that the right side of the equation is equal to 0. This means that $\nabla_\alpha \vec{S}_\beta$ is perpendicular to $\nabla_\alpha \vec{S}_\beta$. Thus, the covariant derivatives of the basis vectors have no components parallel to the basis vectors (and therefore non in the tangent space of the manifold), as stated above. We thus have $\nabla_\alpha \vec{S}_\beta = \vec{N} B_{\alpha\beta}$. The term $B_{\alpha\beta}$ contains the constants of proportionality. It will later be seen to have a very important meaning.

Let's look at this equation again. The covariant derivatives of the basis vectors are not easy to compute. We would rather have the changes in the normal vector be written in terms of the basis vectors rather (as here) the other way around. That proves very easy to do. We know, by definition, that $\vec{N}$ is orthogonal to the $\vec{S}_\beta$. Their inner product is therefore everywhere=0, so we have $\vec{S}_\beta \cdot \vec{N}=0$ everywhere. We therefore have $0=\nabla_\alpha(\vec{S}_\beta \cdot \vec{N})$. By the chain rule we have: $\nabla_\alpha(\vec{S}_\beta \cdot \vec{N})=\vec{N}\cdot\nabla_\alpha\vec{S}_\beta+\vec{S}_\beta\cdot\nabla_\alpha\vec{N}=0$. Now start with $\nabla_\alpha\vec{S}_\beta=B_{\alpha\beta}\vec{N}$ and take the inner product of each side with $\vec{N}$, then use the equation $$\vec{N}\cdot\nabla_\alpha\vec{S}_\beta=-\vec{S}_\beta\cdot\nabla_\alpha\vec{N}=B_{\alpha\beta}$$

Here we have used the fact that the surface normal vector is of unit length. We then have $B_{\alpha\beta}$ in terms of the covariant derivative of $\vec{N}$ which is what we wanted. We now make two changes to the final equation above. First, we note that the $\vec{S}_\beta$ are not necessarily orthogonal to each other, but that each of them is orthogonal to $\vec{S}^\alpha$ for $\alpha \neq \beta$. We therefore want to raise the $\beta$ index on either side. Further, we observe that since $\vec{N}$ is an invariant, its covariant derivative is just its partial derivative. Finally, we note that B is symmetric. These changes lead us to the final form of the equation:

$$B_\alpha^\beta = -\vec{S}^\beta \cdot \frac{\partial \vec{N}}{\partial S^\alpha}$$

The operator with components $B^\beta_\alpha$ is self-adjoint (and, in the case of real entries, symmetric). It is the shape operator and has some nice properties. For our purposes the most important are that the eigenvalues of the shape operator are the principal curvatures of the surface and the eigenvectors are the directions of those principal curvatures. We shall see that as we proceed. Now both $\vec{S}^\beta$ and $\vec{S}^\alpha$ transform using the Jacobians so B transforms using two Jacobians. This proves that it is a second-order tensor.

Now consider the final term in the above equation. We can see that it can also be written $$\frac{\partial \vec{N}}{\partial S^\alpha} = \frac{\partial \vec{N}}{\partial S^\gamma}\vec{S}_\alpha \cdot \vec{S}^\gamma = \vec{\nabla}\vec{N} \cdot \vec{S}_\alpha$$

In the final term we have written the partial derivative of the normal vector as a component of a second order tensor, the vector derivative of the normal vector. This works because the final two terms in the middle equation are just $\delta_\gamma^\alpha$. We can therefore write $$B_\alpha^\beta = -\vec{S}^\beta \cdot \frac{\partial \vec{N}}{\partial S^\alpha} = \vec{S}^\beta \cdot \vec{\nabla}\vec{N} \cdot \vec{S}_\alpha.$$

There are four indices here, though two of them are repeated in $\vec{\nabla}\vec{N}$.

Now go back to the earlier form of the equation $$\vec{N}\cdot\nabla_\alpha\vec{S}_\beta = B_{\alpha\beta}$$

And raise the $\beta$ index, again making use of the symmetry of B.

$$\vec{N}\cdot\nabla_\alpha\vec{S}^\beta = B^\beta_\alpha$$

Remember, however, that $$\vec{S}^\beta = \nabla^\beta \vec{r}$$

Where $\vec{r}$ is the vector from some origin to the point under consideration. Substituting, this gives us $$\vec{N}\cdot\nabla_\alpha\nabla^\beta\vec{r} = B^\beta_\alpha$$

The first term is just the inner product of the Laplacian of the position vector with the normal vector. Since the curvature is, by definition, the normal component of the Laplacian of the position vector, it is clear that the components of $B^\beta_\alpha$ are the curvatures we sought.

Finding the Principal Curvatures

We now use all this to derive the features we needed. The inputs are just a set of surface points in the ambient coordinate system from which we derive the surface normal vectors, also expressed in the ambient coordinate system. There are, of course, errors and uncertainties in the coordinates and the derived surface normal vectors.

Using the point under consideration ($P_0$) and two nearby points ($P_1$ and $P_2$) separated by some region size (the size over which we want to extract the shape features), create a basis vector set in the surface's tangent space. It cannot be just the vectors from the $P_0$ to $P_1$ and from $P_0$ to $P_2$ since, due to noise and manifold curvature, the points of interest may not be in the tangent space. Let those two vectors be called $\vec{u}_1$ and $\vec{u}_2$ respectively and remove any components parallel to the normal vector. Create $\vec{v}_1 = \vec{u}_1 - (\vec{u}_1 \cdot \vec{N}_0)\vec{N}_0$. This is clearly orthogonal to $\vec{N}_0$, and thus in the tangent space. Now create $\vec{v}_2 = \vec{u}_2 - (\vec{u}_2 \cdot \vec{N}_0)\vec{N}_0$ which is clearly also in the tangent space. We could let $\vec{v}_1$ and $\vec{v}_2$ be our tangent space basis vectors but, for simplicity, let's create an orthonormal set from them.

$$\text{Let } \hat{S}_1 = \frac{\vec{v}_1}{|\vec{v}_1|} \text{ and } \hat{S}_2 = \frac{\vec{v}_2 - (\vec{v}_2 \cdot \hat{S}_1)\hat{S}_1}{|\vec{v}_2 - (\vec{v}_2 \cdot \hat{S}_1)\hat{S}_1|}.$$

These are clearly orthonormal.

$\hat{S}_1$ and $\hat{S}_2$ are our basis vectors in the tangent space. From now on, all vectors are expressed in terms of them. Because we chose $\hat{S}_1$ and $\hat{S}_2$ to be orthonormal, their associated contravariant vectors are just the vectors themselves. Thus $\hat{S}_1 = \hat{S}^1$ and $\hat{S}_2 = \hat{S}^2$. In the expression $B^\beta_\alpha = -\hat{S}^\beta \cdot \vec{\nabla}\vec{N} \cdot \hat{S}^\alpha$, $\vec{\nabla}\vec{N}$ is a second order tensor. We can approximate $\vec{\nabla}\vec{N}$ to first order with the following equation for each of the $P_i$ in the patch around $P_0$.

$$(\vec{P_i - P_0}) \cdot \vec{\nabla}\vec{N} \approx \vec{N_i} - \vec{N_0}$$

Let's now define $$\vec{\nabla}\vec{N} = \begin{bmatrix} \alpha & \beta \\ \beta & \gamma \end{bmatrix}.$$

Here we have taken advantage of the fact that since B is self-adjoint, so is $\vec{\nabla}\vec{N}$. We also define $$(\vec{P_I - P_0}) = \begin{bmatrix} a_i \\ b_i \end{bmatrix} \text{ and } \vec{N_i} - \vec{N_0} = \begin{bmatrix} c_i \\ d_i \end{bmatrix}.$$

Substituting produces the equation.

$$\begin{bmatrix} \alpha & \beta \\ \beta & \gamma \end{bmatrix} \begin{bmatrix} a_i \\ b_i \end{bmatrix} \approx \begin{bmatrix} c_i \\ d_i \end{bmatrix}$$

Because of errors in point positioning, we want to use more than the minimum number of points to determine the curvatures and their directions. Assume we choose n points near $P_0$. Using the above equation expanded to include the points and unwrapping the second order tensor, we get the following equation:

$$\begin{bmatrix} a_1 & b_1 & 0 & 0 \\ 0 & 0 & a_1 & b_1 \\ a_2 & b_2 & 0 & 0 \\ \vdots & \vdots & \vdots & \vdots \\ 0 & 0 & a_n & b_n \end{bmatrix} \begin{bmatrix} \alpha \\ \beta \\ \beta \\ \gamma \end{bmatrix} \approx \begin{bmatrix} c_1 \\ d_1 \\ c_2 \\ \vdots \\ d_n \end{bmatrix}$$

Solving this fits the parameters to a least-squared optimum. This equation can be cast as $$A^T \vec{\alpha} = \vec{C}$$

we want to solve for $\vec{\alpha}$. $A^T$ is not invertible (since it isn't square), so we have to form the pseudo-inverse. This can be done by multiplying each side by A and then multiplying both sides by $[[AA^T]^{-1}]^{-1}$. This gives $$\vec{\alpha} = [AA^T]^{-1} A \vec{C}$$

By rearranging the components of a we get the components of $\vec{\nabla} \vec{N}$. Since we have an orthonormal set $\hat{S}_1 = \hat{S^1}$ and $\hat{S}_2 = \hat{S^2}$, when we dot $\vec{\nabla} \vec{N}$ from left and right by the $\hat{S^i}$ and arrange the results into a square matrix, we get the components of B. This is much easier in practice because we first chose a locally orthonormal basis. From this we can derive the principal curvatures and their directions.

Let the eigenvalues of B be $\kappa_1$ and $\kappa_2$. These are the principal curvatures of the surface. We can find them easily from B. $k_1$ $\kappa_1 \kappa_2 = \det(B)$ and $\kappa_1 + \kappa_2 = \mathrm{Tr}(B)$. This gives $$\kappa_1 = \kappa_{min} = \frac{Tr(B)}{2} - \sqrt{\left(\frac{Tr(B)}{2}\right)^2 - \mathrm{Det}(B)}$$

$$\kappa_2 = \kappa_{max} = \frac{Tr(B)}{2} + \sqrt{\left(\frac{Tr(B)}{2}\right)^2 - \mathrm{Det}(B)}$$

The eigenvectors (the directions of the principal curvatures) can be found from the usual eigenvalue/eigenvector equation:

$$\begin{bmatrix} \alpha - \kappa & \beta \\ \beta & \gamma - \kappa \end{bmatrix} \begin{bmatrix} f \\ g \end{bmatrix} = 0 \text{ and}$$

$$f^2 + g^2 = 1$$

The latter is the requirement that the eigenvectors be of unit length. We now have the principal curvature directions.

Because they are the eigenvectors of a symmetric matrix and of unit length, they are orthonormal. The proof that the principal curvature directions are orthogonal is a bit long-winded but follows from the fact that the curvature is the second fundamental form divided by the first fundamental form.

Calculating the Pseudo-Laplacian and the Gradient Image Region

Now that we have calculated the local curvatures, we can modify the Laplacian approach to point of interest characterization to take the distortions caused by the curvatures into effect as we extract the characteristics of the point of interest. There is no first-order effect in the point of interest features—since the model enables us to view the surface perpendicularly, but there are second-order effects. To calculate both the pseudo-Laplacian and the gradient features of the image, we need to know what a circle on the surface approximates to. The current approach implicitly assumes that in the region of a point of interest, the surface curvature does not materially change from what it is at $P_0$.

Assuming we are calculating the circle needed for both the pseudo-Laplacian and the gradients by looking straight down (i.e. inward along the surface normal), if the "radius" of the circle on the surface is L, we will see pixels out to 1.

$$\theta = \frac{L}{R}.$$

A small snippet of l is dl and of L is dL. The angle between them at some point on the surface is just θ at that point. We therefore have dl=dL cos(θ)=R cos(θ) dθ. Integrating gives $$l = R \sin\left(\frac{L}{R}\right)$$

Since this is true in any direction, if φ is the direction of minimum curvature $$\kappa_1 \varphi + \frac{\pi}{2}$$

is the direction of maximum curvature $\kappa_2$ we have $$l = \kappa_1 \sin\left(\frac{L}{\kappa_1}\right)\cos(\varphi) + \kappa_2 \sin\left(\frac{L}{\kappa_2}\right)\sin(\varphi)$$

This gives us all the components we set out to acquire.

Matching Digital Fingerprints

Now that we have derived the features we intend to use for matching, we proceed to techniques taught relative to the matching itself. There are several different forms of matching that fall under the teachings of this disclosure, for example the matching process described below.

Kiosk to kiosk matching using full model digital fingerprints matches the full 3D digital fingerprint of the model created at acquisition 2 with a reference set of full 3D digital fingerprints of models created at acquisition 1. This is the standard matching for the taught system. Kiosk to kiosk matching using individual images in one acquisition and the model in the other is used when one of the acquisitions was not sufficient to produce a good model and the other was.

Kiosk to kiosk matching using individual images is used when neither acquisition got good enough images to create a model. Corridor to kiosk matching using projected digital fingerprints from the model compares corridor-acquired images to digital fingerprints of the model as seen from the optimal (meaning that it gives the best match) viewpoint and distance. Corridor to kiosk matching using individual kiosk image digital fingerprints compares the corridor image's digital fingerprint to the individual digital fingerprints of the kiosk acquisition. Corridor to corridor matching using corridor images as both induction and acquisition compares one or more images acquired with the corridor camera with other image digital fingerprints acquired the same way.

Clearly the "reference" acquisition must associate the digital fingerprint with whatever information (e.g. identity, rights, obligations) the digital fingerprint controls or grants access to. That is much easier to do at a fixed induction point (where such information is easier to collect), so in that case the "corridor" induction system is really a single-camera version of the full kiosk. The six conditions above require three kinds of matching including full model to full model, full model to individual image, and individual image to individual image.

Without the teachings of this disclosure, we would have to do a full projection transform with full rubber sheet distortions in order to get a match between two acquisitions of something as fully three-dimensional and as deformable as a face. Such matching is very difficult to do for several reasons. With so much variability between acquisitions, the chances that a strong match pair is a true match pair is low. When there are numerous spurious true match pairs, the likelihood of a spurious geometric match to the wrong object increases, as does the likelihood of no match at all.

The way the pieces of this system, as taught by this disclosure, work together gets rid of most of this spurious matching and hence greatly increases accuracy as well as greatly reduces the processing time. Instead of a full projective transform, for example, building a model of the surface and then digitally fingerprinting that model enables features to be extracted looking "straight down" on any part of the surface. This means that points of interest are characterized more accurately, since there is very little ambiguity in off-axis viewing (there is essentially none). Building the model and then digitally fingerprinting that also means that we can construct both sets of digital fingerprints as though we were at a fixed distance, with a fixed resolution, angle, and orientation from the object. Rather than having to find a large number of match pairs on the two acquisitions simply because of distance, orientation, and angle of view, all we have to deal with is the distortions caused by changes in the object itself (such as facial expression). This means local distortions even in the presence of rubber sheet deformations of the object are likely to be no worse than affine. It also means that blur-difference-insensitive algorithms for point of interest and detection can be used effectively even if they have greatly increased sensitivity to scale, since the distance to the object and the size of a pixel on the object are known everywhere.

The system proposed here has to capture images that will be used to build a model of the object from which digital fingerprints are extracted. Those digital fingerprints will be used for two different kinds of matching—against digital fingerprints captured on a similar three-dimensional imager, and against two-dimensional images (so-called corridor matching). The hardware for capturing the "corridor" images is outside the scope of this disclosure but the need to prepare digital fingerprints that can be so used is within view in this disclosure.

Full model to full model matching. The person was inducted at a kiosk as described in this disclosure and is now being authenticated at a similar kiosk. As mentioned above, several different ways of using the captured images may be used under different conditions and still be within view in the teachings of this disclosure. The most important are matching the full three-dimensional digital fingerprints of two acquisitions, matching the two-dimensional digital fingerprints of the individual images to the similar digital fingerprints in the other acquisition, and cross matching of 2D to 3D with both set of images captured at the kiosk.

Matching 2D to 3D is covered in the next section. 3D to 3D digital fingerprint matching is straightforward, with several ways apparent to those skilled in the art. The following has been shown to be very effective. Points of interest extracted from the models of the object are first compared to find strong match pairs between the test digital fingerprint and the references. A strong match, as discussed above, is where the feature vectors of the two points of interest match to within some threshold, are the top few such matches in the reference set, or by some other means of determining that these two points of interest are sufficiently similar to be candidates for the next operation.

After we collect a set of potential match pairs, we apply the geometric constraints to both find true match pairs and to characterize the transformation between the two acquisitions. These constraints are in three dimensions but are made considerably simpler by coming from the model instead of the individual images, since the model, in effect, "pre-normalizes" the geometry. Indeed, were the object viewed from a new point of view, the model could be rotated and placed in the correct orientation so that only direct matching (all points of interest that form true match pairs are in the same position on the two models) is required for non-malleable objects. In other words, the strong matches that become true matches are simply those in the same positions on the two (properly oriented) models.

Full model to individual image. This has two places where it is used in the teachings of this disclosure. The first is in comparing digital fingerprints from images captured at the kiosk but where a satisfactory model could not be constructed from one of the acquisition sets. The other is in comparing "corridor" image digital fingerprints (2D) to kiosk digital fingerprints.

Individual image to model digital fingerprints. This involves determining how the model projects into the plane of the individual image, modifying the three-dimensional points of interest locations to the resulting planes, and then doing matching of the result. This has applicability when doing 2D vs 3D, but also where one of the 3D acquisitions is deficient and a good model could not be built from it.

Individual image to individual image. This matches individual images to individual images, though what those individual images are may be quite different under different circumstance. There are three places in view in this disclosure where 2D to 2D matching may be used.

Corridor to corridor matching. In this case both the reference and the test inductions are taken with single cameras, there is no model to compare against, and, in general, the images are of lower quality and less controlled for viewpoint and lighting than the individual images from the kiosk. There is no guarantee that acquisition conditions for illumination or viewpoint are consistent. In addition, there is maximum variability in what the person is doing (especially turning head, talking, moving) at the two acquisitions. This kind of acquisition puts the greatest pressure on the algorithms. The hardware can help by capturing a running sequence of images and attempting to authenticate them until authentication is achieved or the person moves out of range. It also helps by finding the face and focusing in on it.

The software in corridor to corridor matching needs to isolate faces in the field of view, cause the camera to focus in on them in some sort of sequence. Here the points of interest already found are useful, though they have to be matched in the presence of affine, homographic, projective, perspective, or rubber sheet distortions between the acquisitions. There may be multiple images of the person in the reference set and the test set because, for example, they were taken as a sequence to ensure some good ones in each acquisition set. This means the reference set will be aggregated, the test set tested until either authentication was achieved or the person passes out of range.

Corridor to the individual images from kiosk. This compares corridor-acquired images with the individual images from the kiosk. Much of the problems are the same as those in the corridor to corridor situation but are somewhat ameliorated by the controlled conditions at the kiosk acquisition. In principle either acquisition set could be the "reference" or "induction" set, but in practice is it much more likely the kiosk will be the site of induction so that credentials can be presented.

Corridor to "best" "image" as derived from optimal "looking down" at the model. This has several benefits to corridor to individual images from kiosk. First, the point of view can be optimized by "looking" at the model, which can tell us how the object would look at any distance and from any angle. We can choose the viewpoint (altitude, azimuth, and distance) from which we present the digital fingerprints derived from the model. We, of course, then translate and project their three-space coordinates into the 2D coordinate system of the corridor image.

Figure 6:
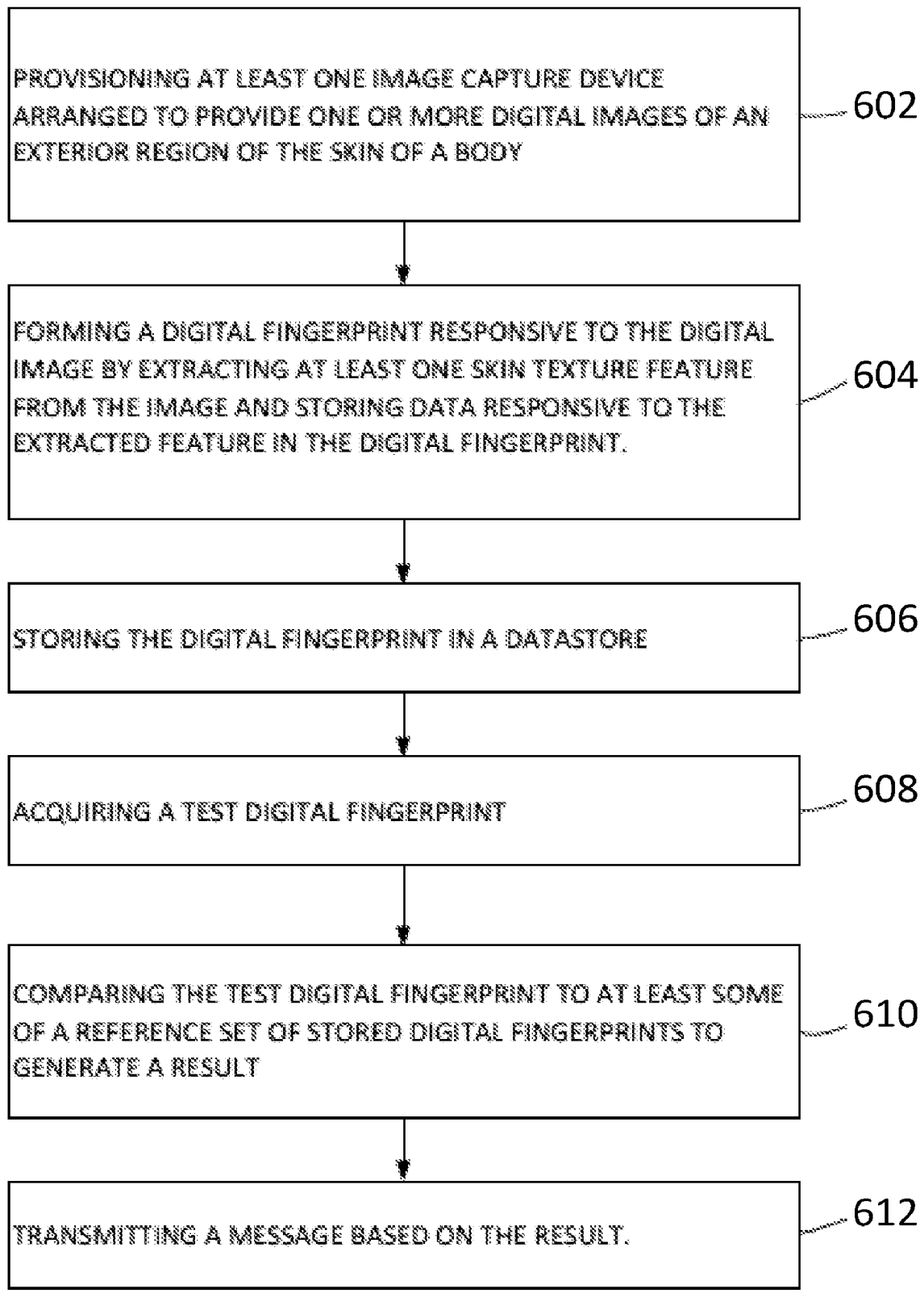
FIG. 6 is a flowchart illustrating a method for authentication using biometrics, according to at least one illustrated implementation.

FIG. 6 illustrates one exemplary authentication process using biometrics. As shown, to capture biometrics information, at least one image capture device is arranged to provide one or more digital images of an exterior region of the skin of a body at block 602. At block 604, a digital fingerprint is formed by extracting at least one skin texture feature from the image. The digital fingerprint may be responsive to the digital image and data response to the extracted feature in the digital fingerprint may be stored in the datastore. At block 606, the digital fingerprint may be stored in the datastore. To begin authentication, a test digital fingerprint may be acquired for a target object that the system will attempt to authenticate at block 608. At block 610, the test digital fingerprint may be compared to at least one reference of reference set of digital fingerprints for the target object stored in the datastore to generate a result. For example, the result may be an indication of authenticity or an indication or non-authenticity. At block 612, a message may be transmitted based on the result. The message may indicate, for example, whether or not the target object was authenticated and or the features the contributed to a determination of authenticity and or non-authenticity The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A system, comprising:
   a frame having a center plane that vertically bisects the frame, a first wing and a second wing, the first wing on a first side of the center plane, and the second wing on a second side of the center plane, the second side across the center plane from the first side;
   a first image sensor mounted to the first wing, the first image sensor having a first field of view that extends along a first principal axis that intersects the center plane of the frame at a first positive distance outward along the center plane in a first direction from the frame;
   a second image sensor mounted to the second wing, the second image sensor having a second field of view that extends along a second principal axis that intersects the center plane of the frame at a second positive distance outward along the center plane in the first direction from the frame;

at least one processor, the at least one processor communicatively coupled to the first image sensor and at least the second image sensor; and at least one non-transitory processor-readable storage medium communicatively coupled to the at least one processor and which stores processor-executable instructions, the processor-executable instructions when executed by the at least one processor, cause the at least one processor to:

extract at least one facial feature from the one or more images of at least a portion of a human face captured by at least the first and the second image sensors; and form a digital fingerprint based at least in part on the extracted at least one facial feature, the digital fingerprint which uniquely identifies the human face, and wherein the first distance at which the first principal axis intersects the center plane is equal to the second distance at which the first principal axis intersects the center plane, and wherein, when a face is positioned at a point at which the first principal axis and the second principal axis intersect the center plane, the first principal axis intersects a Sagittal plane of the face at a non-zero acute angle and the second principal axis intersects the Sagittal plane of the face at a non-zero acute angle.

2. The system of claim 1, further comprising: a third image sensor mounted to the frame, the third image sensor having a third field of view that extends along a third principal axis that extends along the center plane in the first direction.

3. The system of claim 1, further comprising: a display screen mounted to the frame, the display screen having a display surface that is centered about the center plane and visible from a positive distance along the center plane in the first direction.

4. The system of claim 1 wherein the frame includes a center portion that is perpendicular to the center plane and the first wing extends from a first edge of the center portion and the second wing extends from a second edge of the center portion.

5. The system of claim 4, further comprising: a third image sensor mounted to the center portion of the frame, the third image sensor having a third field of view that extends along a third principal axis that extends along the center plane in the first direction from the frame; and a display screen mounted to the center portion of the frame, the display screen having a display surface that is centered about the center plane and visible from a positive distance along the center plane in the first direction.

6. The system of claim 1 wherein the first image sensor and the second imager sensor are laterally spaced from one another across the center plane by a distance sufficient to capture partially overlapping images of a face when the face is positioned at a point at which the first principal axis and the second principal axis intersect the center plane.

7. The system of claim 1, further comprising: a fourth image sensor mounted to the first wing of the frame, the fourth image sensor having a fourth field of view that extends along a fourth principal axis that intersects the center plane of the frame at a fourth positive distance outward along the center plane in the first direction from the frame; and a fifth image sensor mounted to the second wing of the frame, the fifth image sensor having a fifth field of view that extends along a fifth principal axis that intersects the center plane of the frame at a fifth positive distance outward along the center plane in the first direction from the frame.

8. The system of claim 7 wherein the fourth image sensor is vertically aligned with the first image sensor and the fifth image sensor is vertically aligned with the second image sensor.

9. The system of claim 8, further comprising: a sixth image sensor mounted to the frame, the sixth image sensor having a sixth field of view that extends along a sixth principal axis that extends that extends along the center plane in the first direction.

10. The system of claim 1, further comprising: at least one light source mounted to the frame and oriented to project light outwardly in the first direction from the frame.

11. The system of claim 10 wherein the at least one light source comprises two or more lighting panels that positioned and oriented on the frame to provide a balanced light field to a human face when the human face is positioned at a point at which the first principal axis and the second principal axis intersect the center plane.

12. The system of claim 1 wherein the first image sensor is part of a first camera, and the second image sensor is part of a second camera.

13. A system, comprising:
a frame having a center plane that vertically bisects the frame, a first wing and a second wing, the first wing on a first side of the center plane, and the second wing on a second side of the center plane, the second side across the center plane from the first side;

a first image sensor mounted to the first wing, the first image sensor having a first field of view that extends along a first principal axis that intersects the center plane of the frame at a first positive distance outward along the center plane in a first direction from the frame;

a second image sensor mounted to the second wing, the second image sensor having a second field of view that extends along a second principal axis that intersects the center plane of the frame at a second positive distance outward along the center plane in the first direction from the frame;

at least one processor, the at least one processor communicatively coupled to the first image sensor and at least the second image sensor; and at least one non-transitory processor-readable storage medium communicatively coupled to the at least one processor and which stores processor-executable instructions, wherein the processor-executable instructions stored by the at least one non-transitory processor-readable storage medium, when executed by the at least one processor, cause the at least one processor to:

extract at least one facial feature from the one or more images of at least a portion of a human face captured by at least the first and the second image sensors; and form a digital fingerprint based at least in part on the extracted at least one facial feature, the digital fingerprint which uniquely identifies the human face.

14. The system of claim 13 wherein the processor-executable instructions stored by the at least one non-transitory processor-readable storage medium, when executed by the at least one processor, cause the at least one processor to:

identify one or more points of interest in the one or more images of at least the portion of the human face captured by the at least one image sensor, wherein the extraction of at least one facial feature is performed for each of the identified one or more points of interest.

15. The system of claim 13 wherein the processor-executable instructions stored by the at least one non-transitory processor-readable storage medium, when executed by the at least one processor, cause the at least one processor to:
normalize out at least one of variations or changes that occur on scales larger than a scale of regions from which of a point of interest is identified.

16. The system of claim 13 wherein to normalize out at least one of variations or changes, when executed by the at least one processor, the processor-executable instructions cause the at least one processor to:
normalize at least one of an absolute illumination, a blur, a scale, an angle of view, or distortion in the captured images of the face.

17. The system of claim 13 wherein at least the first and the second image sensors capture multiple images at different respective focal planes while the human face is inserted into the interior of the structure, and wherein the processor-executable instructions stored by the at least one non-transitory processor-readable storage medium, when executed by the at least one processor, cause the at least one processor to:
combine two or more of the captured multiple images captured at the different respective focal planes.

18. The system of claim 13 wherein the processor-executable instructions stored by the at least one non-transitory processor-readable storage medium, when executed by the at least one processor, cause the at least one processor to:
merge multiple images of a same area of a face or overlapping images that include a same area of the face to form a single image from which points of interest are extracted.

19. The system of claim 18 wherein to merge multiple images of a same area of the face or overlapping images that include a same area of the face, when executed by the at least one processor, the processor-executable instructions cause the at least one processor to:
perform at least one of: a pixel-by-pixel average, a pixel-by-pixel median, or weight each pixel by a distance from an edge of the field of view of the at least one image sensor.

20. The system of claim 13 wherein the processor-executable instructions stored by the at least one non-transitory processor-readable storage medium, when executed by the at least one processor, cause the at least one processor to:
cause the digital fingerprint to be saved to a datastore as a reference digital fingerprint for later use in authentication.

21. The system of claim 13 wherein the processor-executable instructions stored by the at least one non-transitory processor-readable storage medium, when executed by the at least one processor, cause the at least one processor to:
compare the digital fingerprint to a reference digital fingerprint; and produce a result of the comparison.

22. The system of claim 21 wherein the processor-executable instructions stored by the at least one non-transitory processor-readable storage medium, when executed by the at least one processor, cause the at least one processor to:
transmit a notification of the result of the comparison.

23. A system, comprising:
a frame having a center plane that vertically bisects the frame, a first wing and a second wing, the first wing on a first side of the center plane, and the second wing on a second side of the center plane, the second side across the center plane from the first side;
a first image sensor mounted to the first wing, the first image sensor having a first field of view that extends along a first principal axis that intersects the center plane of the frame at a first positive distance outward along the center plane in a first direction from the frame;
a second image sensor mounted to the second wing, the second image sensor having a second field of view that extends along a second principal axis that intersects the center plane of the frame at a second positive distance outward along the center plane in the first direction from the frame;
at least one processor, the at least one processor communicatively coupled to the first image sensor and at least the second image sensor; and
at least one non-transitory processor-readable storage medium communicatively coupled to the at least one processor and which stores processor-executable instructions, wherein the processor-executable instructions stored by the at least one non-transitory processor-readable storage medium, when executed by the at least one processor, cause the at least one processor to:
extract at least one facial feature from the one or more images of at least a portion of a human face captured by at least the first and the second image sensors; and
form a digital fingerprint based at least in part on the extracted at least one facial feature, the digital fingerprint which uniquely and anonymously identifies the human face.

24. The system of claim 23 wherein the first distance at which the first principal axis intersects the center plane is equal to the second distance at which the first principal axis intersects the center plane.

25. The system of claim 23 wherein, when a face is positioned at a point at which the first principal axis and the second principal axis intersect the center plane, the first principal axis intersects a Sagittal plane of the face at a non-zero acute angle and the second principal axis intersects the Sagittal plane of the face at a non-zero acute angle.

* * * * *